(12) United States Patent
Vollath et al.

(10) Patent No.: US 7,589,668 B2
(45) Date of Patent: Sep. 15, 2009

(54) GNSS SIGNAL PROCESSING WITH FREQUENCY-DEPENDENT BIAS MODELING

(75) Inventors: Ulrich Vollath, Unterfoehring (DE); Kenneth Donald Doucet, Dartmouth (CA)

(73) Assignee: Trimble Navigation Limited, Sunnyvale, CA (US)

(*) Notice: Subject to any disclaimer, the term of this patent is extended or adjusted under 35 U.S.C. 154(b) by 0 days.

(21) Appl. No.: 11/983,926

(22) Filed: Nov. 12, 2007

(65) Prior Publication Data

US 2008/0165055 A1 Jul. 10, 2008

Related U.S. Application Data

(63) Continuation of application No. 11/526,960, filed on Sep. 26, 2006, now Pat. No. 7,312,747.

(60) Provisional application No. 60/723,038, filed on Oct. 3, 2005.

(51) Int. Cl.
*G01S 5/14* (2006.01)
(52) U.S. Cl. .................................. 342/357.04
(58) Field of Classification Search ............. 342/357.04
See application file for complete search history.

(56) References Cited

U.S. PATENT DOCUMENTS

| | | | |
|---|---|---|---|
| 5,825,326 A | 10/1998 | Semler | |
| 5,914,685 A | 6/1999 | Kozlov | |
| 6,181,274 B1 | 1/2001 | Pratt | |
| 6,229,479 B1 | 5/2001 | Kozlov et al. | |
| 6,441,780 B1 | 8/2002 | Rog et al. | |
| 6,731,701 B2 | 5/2004 | Vorobiev et al. | |
| 6,753,810 B1 | 6/2004 | Yang et al. | |
| 7,312,747 B2 * | 12/2007 | Vollath et al. | 342/357.04 |
| 2005/0101248 A1 | 5/2005 | Vollath | |
| 2005/0190103 A1 | 9/2005 | Rapoport et al. | |
| 2005/0231423 A1 | 10/2005 | Han | |

OTHER PUBLICATIONS

H. Landau et al., "Carrier Phase Ambiguity Resolution Using GPS and GLONASS Signals," Proceedings of the Institute of Navigation (ION) GPS, Sep. 17, 1996, pp. 917-923.

(Continued)

*Primary Examiner*—Thomas H Tarcza
*Assistant Examiner*—Fred H Mull
(74) *Attorney, Agent, or Firm*—Bruce D. Riter

(57) ABSTRACT

Three new methods are presented to improve floating solutions and ambiguity resolution for multiple global satellite navigation systems (GNSS), one of which may be an FDMA-based GNSS such as GLONASS: (1) modeling of the hardware-related differential clock error between two (or more) different GNSS, (2) modeling the frequency-dependent biases present in frequency-division multiple access (FDMA) GNSS, and (3) an ambiguity resolution method called Scoreboard Partial Fixing (SPF). The methods presented are independent of the number of carrier frequencies tracked for each satellite navigation system. Their application results in quicker and more reliable ambiguity resolution. The benefits of combining observations of multiple GNSS are exploited in a very efficient way, in contrast to known algorithms which often result in degraded performance with multiple GNSS. The frequency-dependent bias method has been found effective with GNSS observations from a combination of substantially dissimilar hardware, e.g., for processing signals from GNSS receivers of different manufacturers.

47 Claims, 18 Drawing Sheets

OTHER PUBLICATIONS

Notification of Transmittal of the International Search Report and the Written Opinion of the International Searching Authority, with International Search Report and Written Opinion of the International Searching Authority in International Application No. PCT/US2006/037538, dated Apr. 18, 2008 (14 pages).

R. Hatch, "Instantaneous Ambiguity Resolution," Kinematic Systems in Geodsy, Surveying, and Remote Sensing, Sep. 1, 1990, pp. 299-308.

D. Walsh et al., "GPS and GLONASS Carrier Phase Ambiguity Resolution," Proceedings of the Institute of Navigation (ION) GPS, Sep. 17, 1996, pp. 899-907.

Notification of Transmittal of the International Search Report and the Written Opinion of the International Searching Authority, with International Search Report and Written Opinion of the International Searching Authority in International Application No. PCT/US2006/037537, dated May 20, 2008 (14 pages).

U. Rossbach, "GLONASS Double Difference Ambiguity Resolution in Real-Time," ION GPS 2000, Sep. 22, 2000, pp. 163-171.

A. Leick et al., "Processing GLONASS Carrier Phase Observations—Theory and First Experience," Proceedings of the ION Satellite Division, Sep. 15, 1995, pp. 1041-1047.

D. Walsh et al., "GPS and GLONASS Carrier Phase Ambiguity Resolution," Proceedings of the Institute of Navigation (ION) GPS, Sep. 17, 1996, pp. 899-907.

H. Landau et al., "Carrier Phase Ambiguity Resolution Using GPS and GLONASS Signals," Proceedings of the Institute of Navigation (ION) GPS, Sep. 17, 1996, pp. 917-923.

Notification of Transmittal of the International Search Report and the Written Opinion of the International Searching Authority, with International Search Report and Written Opinion of the International Searching Authority in International Application No. PCT/US2006/037532, dated May 21, 2008 (14 pages).

* cited by examiner

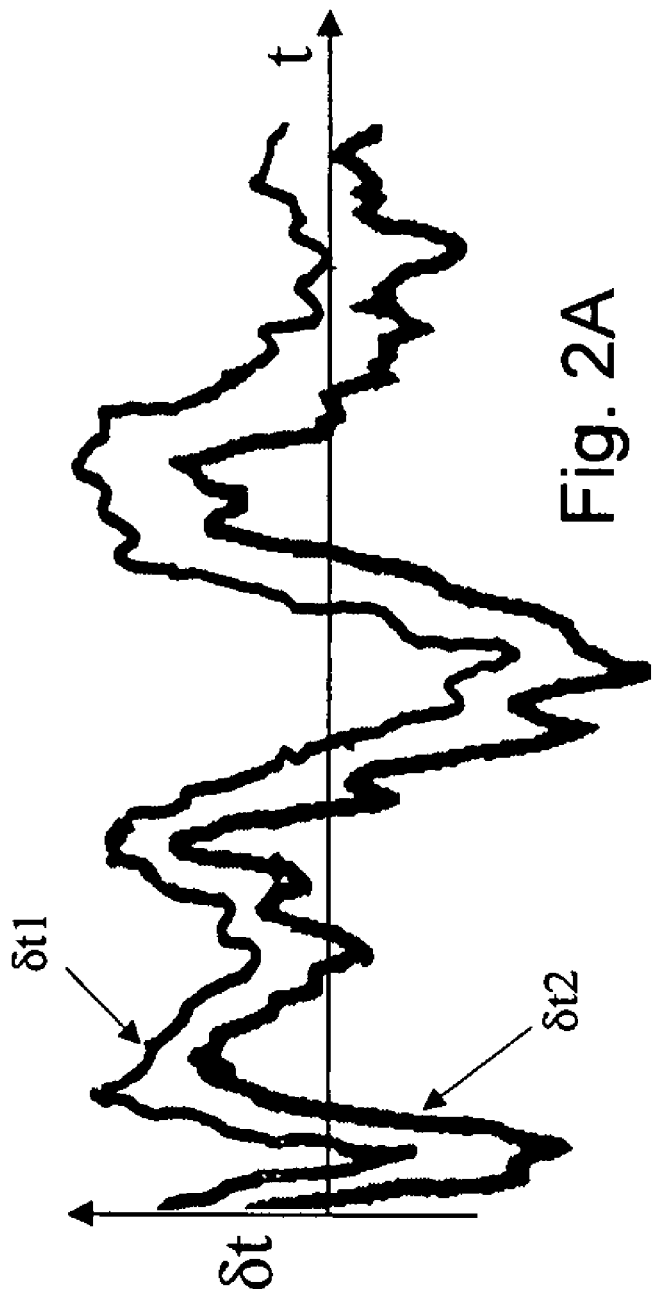
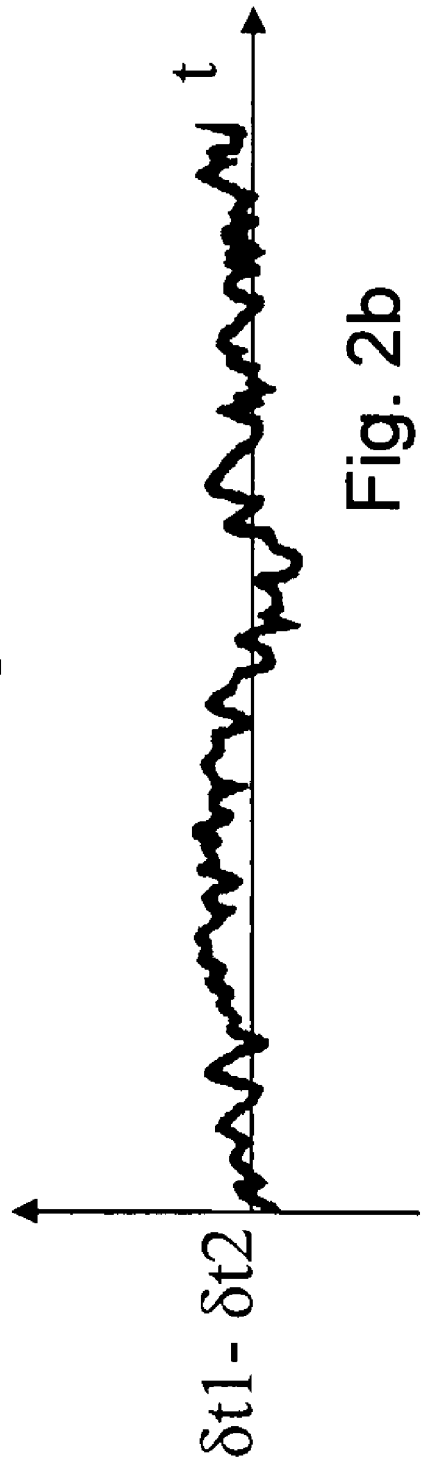
Fig. 2A
Fig. 2b

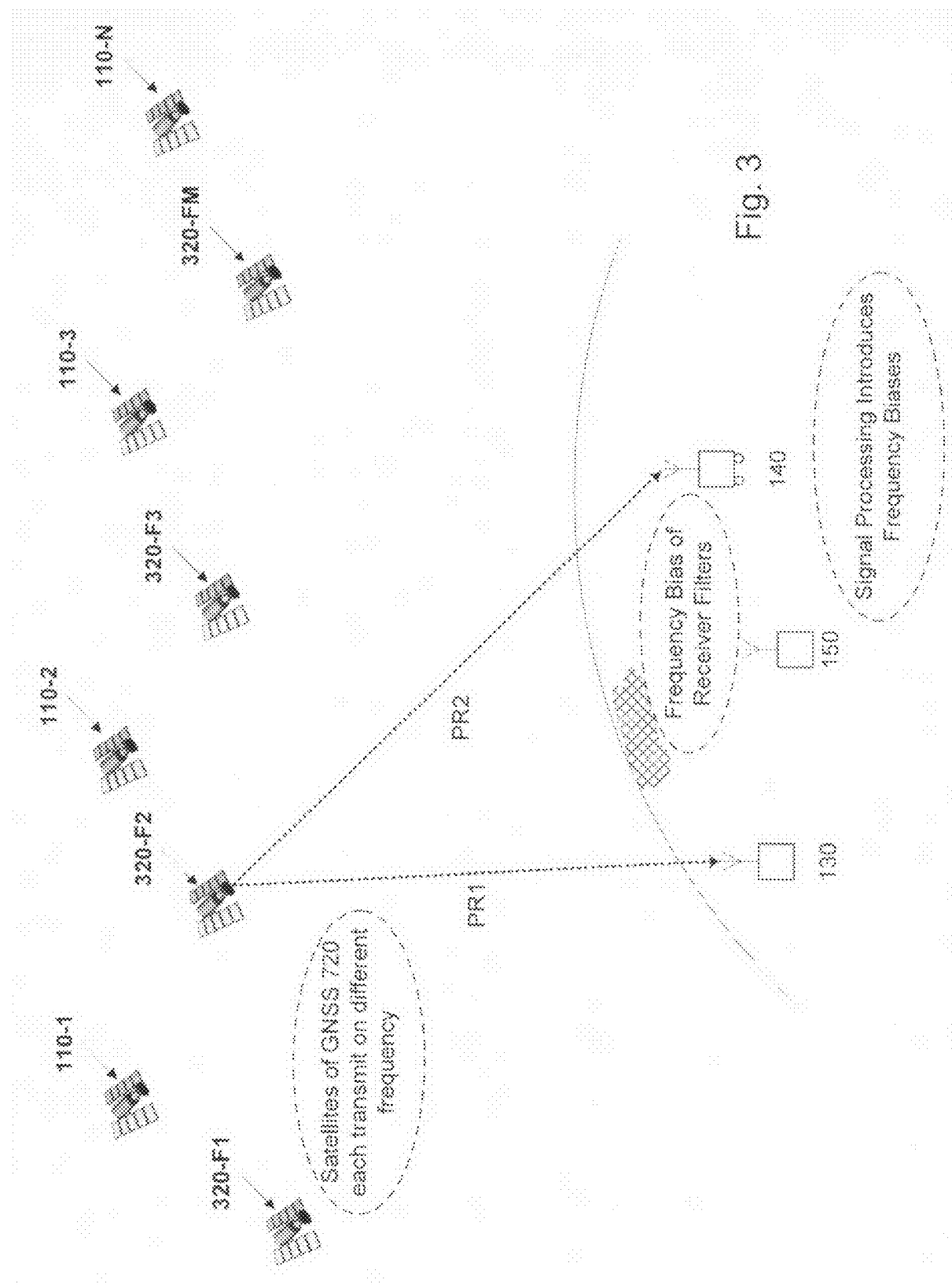

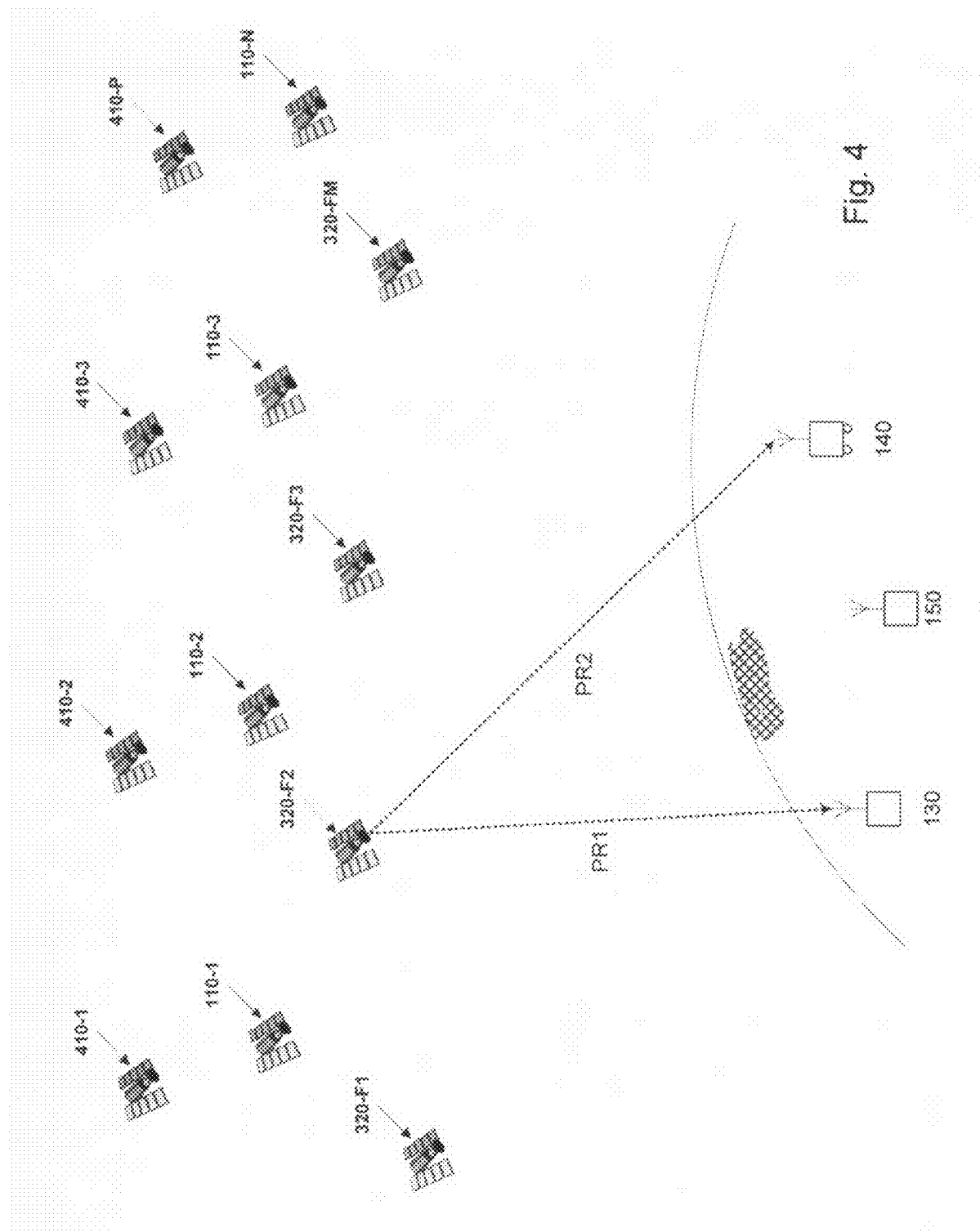

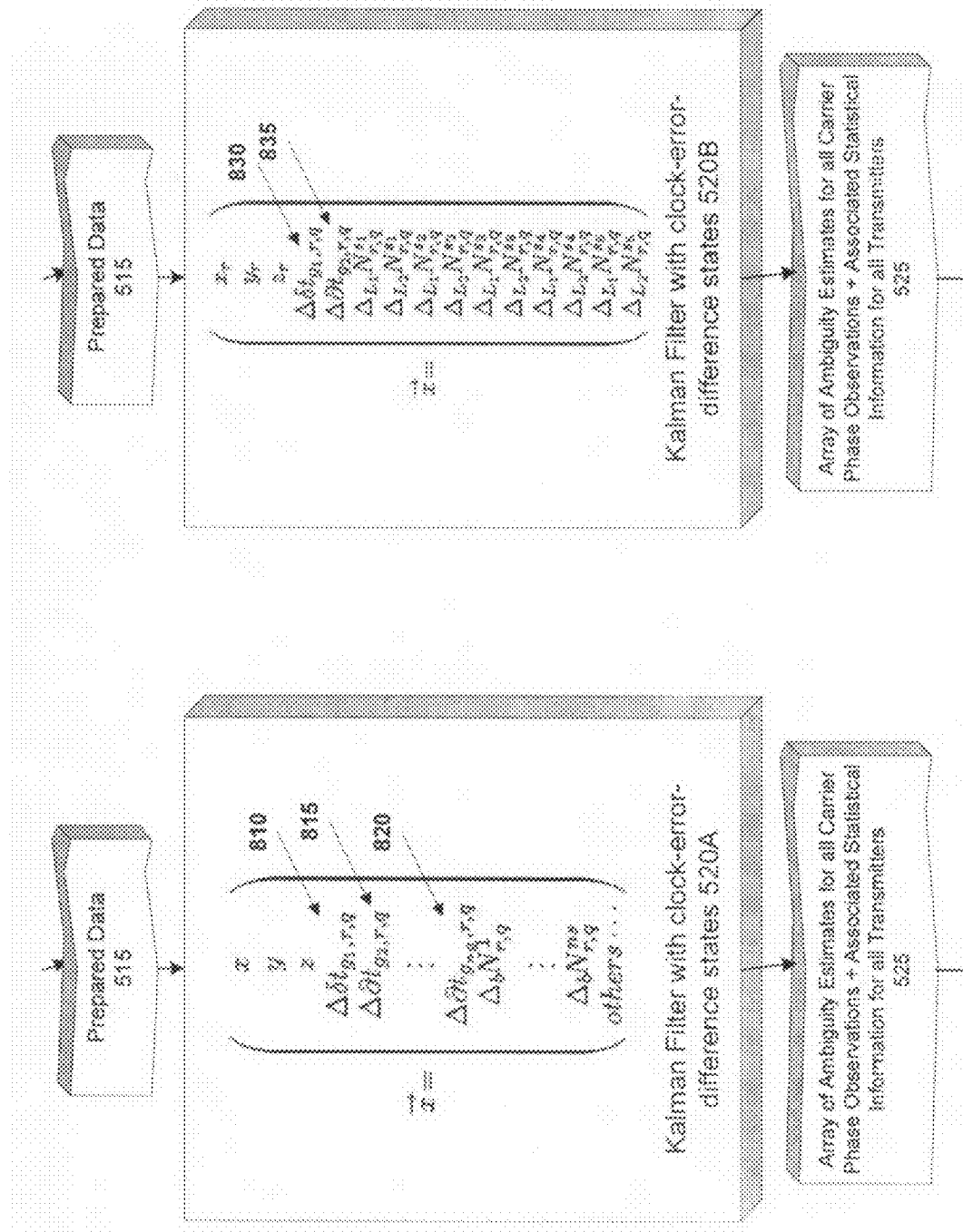

| Set | Full | Part₁ | Part₂ | Part₃ | Part₄ | Part₅ | Part₆ |
|---|---|---|---|---|---|---|---|
| Prob | 99.20 | 98.00 | 99.99 | 93.33 | 98.20 | 100.00 | 99.01 |
| Val. | No | No | Yes | No | No | Yes | No |
| sv | 02 | | 02 | 02 | 02 | 02 | 02 |
| N₁ | 4 | | 4 | 4 | 9 | 4 | 9 |
| N₂ | -3 | | -3 | -3 | 1 | -3 | -4 |
| sv | 07 | 07 | | 07 | 07 | 07 | 07 |
| N₁ | 10 | 10 | | 10 | 5 | 10 | 10 |
| N₂ | 17 | 17 | | 17 | 13 | 17 | 17 |
| sv | 11 | 11 | 11 | | 11 | 11 | 11 |
| N₁ | -3 | -3 | -3 | | -3 | -3 | -2 |
| N₂ | 12 | 12 | 12 | | 12 | 12 | 14 |
| sv | 17 | 17 | 17 | 17 | | 17 | 17 |
| N₁ | -4 | -4 | -4 | -4 | | -4 | -4 |
| N₂ | -9 | -9 | -9 | -9 | | -9 | -9 |
| sv | 23 | 23 | 23 | 23 | 23 | | 23 |
| N₁ | 10 | 10 | 10 | 10 | 10 | | 10 |
| N₂ | 12 | 12 | 12 | 12 | 12 | | 12 |
| sv | 28 | 28 | 28 | 28 | 28 | 28 | |
| N₁ | -16 | -17 | -16 | -16 | -17 | -16 | |
| N₂ | 17 | 16 | 17 | 17 | 16 | 17 | |

Fig. 16A

| Set | Full | Part₁ | Part₂ | Part₃ | Part₄ | Part₅ | Part₆ |
|---|---|---|---|---|---|---|---|
| Prob | 100.00 | 98.00 | 99.99 | 93.33 | 98.20 | 63.40 | 99.01 |
| Val. | Yes | No | Yes | No | No | No | No |
| sv | 02 | | 02 | 02 | 02 | 02 | 02 |
| N₁ | 4 | | 4 | 4 | 4 | 4 | 4 |
| N₂ | -3 | | -3 | -3 | -3 | -3 | -3 |
| sv | 07 | 07 | | 07 | 07 | 07 | 07 |
| N₁ | 10 | 10 | | 10 | 10 | 10 | 10 |
| N₂ | 17 | 17 | | 17 | 17 | 17 | 17 |
| sv | 11 | 11 | 11 | | 11 | 11 | 11 |
| N₁ | -3 | -3 | -2 | | -3 | -3 | -3 |
| N₂ | 12 | 12 | 13 | | 12 | 12 | 12 |
| sv | 17 | 17 | 17 | 17 | | 17 | 17 |
| N₁ | -4 | -4 | -4 | -4 | | -4 | -4 |
| N₂ | -9 | -9 | -9 | -9 | | -9 | -9 |
| sv | 23 | 23 | 23 | 23 | 23 | | 23 |
| N₁ | 10 | 10 | 10 | 10 | 10 | | 10 |
| N₂ | 12 | 12 | 12 | 12 | 12 | | 12 |
| sv | 28 | 28 | 28 | 28 | 28 | 28 | |
| N₁ | -16 | -16 | -11 | -16 | -16 | -16 | |
| N₂ | 17 | 17 | 21 | 17 | 17 | 17 | |

Fig. 16B

GNSS SIGNAL PROCESSING WITH FREQUENCY-DEPENDENT BIAS MODELING

I. CROSS REFERENCE TO RELATED APPLICATIONS

Benefit is claimed of the filing date of Provisional United States Patent Application 60/723,038 filed 3 Oct. 2005, the content of which is incorporated herein by this reference. This application is a continuation of U.S. patent application Ser. No. 11/526,960, filed 26 Nov. 2006 (now U.S. Pat. No. 7,312, 747), the benefit of which is claimed and the content of which is incorporated herein by this reference. U.S. patent application Ser. No. 11/983,925 filed Nov. 12, 2007 is also a continuation of U.S. patent application Ser. No. 11/526,960 (now U.S. Pat. No. 7,312,747).

II. TECHNICAL FIELD

The present invention relates to the field of Global Navigation Satellite Systems (GNSS). More particularly, the present invention relates to ambiguity resolution using multiple GNSS and/or GNSS that use FDMA. Especially, the fixed-ambiguity carrier-phase positioning using a combination of GPS and GLONASS signals is substantially improved.

III. BACKGROUND ART

Ambiguity estimation of GNSS signals for three or more carriers is disclosed in Vollath U.S. Pat. Appl. US 2005/0101248 A1, published May 12, 2005. Relative position measuring techniques using both GPS and GLONASS carrier phase measurements are described in Kozlov et al. U.S. Pat. No. 5,914,685, dated Jun. 22, 1999, and in Kozlov et al. U.S. Pat. No. 6,229,479 B1, dated May 8, 2001. A receiver using signals of GLONASS and GPS systems is described in Rog et al. U.S. Pat. No. 6,441,780 B1, dated Aug. 27, 2002.

Navigation data prediction for GPS and GLONASS weak signal tracking is described in Vorobiev et al. U.S. Pat. No. 6,731,701 B2, dated May 4, 2004. Improved methods and apparatus for ambiguity resolution using multiple GNSS and/or GNSS that employ FDMA are desired, as will become apparent from the description below.

IV. DISCLOSURE OF INVENTION

FIG. 1 schematically illustrates a scenario using two GNSS (110, 120), a reference station 130 and a rover 140. One or more additional reference stations 150 may be used. GNSS 120 has two carriers, L1 and L2. Reference station 130 and rover 140 (and reference station(s) 150 if provided) receive GNSS signals from any number of satellites of a first GNSS, such as satellites 110-1, 110-2, . . . 110-N, and from any number of satellites of a second GNSS, such as satellites 120-1, 120-2, . . . , 120-M. Respective pseudo-ranges, PR1, PR2, etc. from each satellite are to be determined from GNSS signal data collected at the receivers (e.g., at the reference station(s) and the rover 140).

Pseudo-range can be determined for example using the GPS C/A code with an error of about one meter. A civil GPS receiver not using the military-only P/Y code determines rover position with an error in the range of meters. However, the phases of the L1 and L2 carriers can be measured with an accuracy of 0.01-0.05 cycles (corresponding to pseudo-range errors of 2 mm to 1 cm), allowing relative position of the rover to be estimated with errors in the range of millimeters to centimeters with appropriate estimation of carrier ambiguities.

Combined processing of signal data from more than one GNSS, such as combined GPS+GLONASS RTK processing, has some special issues to be addressed in the algorithms. These include: A. Clock Difference(s), B. Frequency-Dependent Biases, and C. Partial Fixing.

A. Clock Difference(s). The clock errors of inter-GNSS data, such as GPS and GLONASS data, can differ from a few meters to a few tens of meters, depending on the receiver hardware used. FIG. 2A is a typical plot versus time of clock-error bias $\delta t_1$ of GNSS 110 and clock-error bias $\delta t_2$ of GNSS 120. The values of $\delta t_1$ and $\delta t_2$ vary over a range corresponding to tens of meters of error and are unpredictable from epoch to epoch. Prior-art techniques model $\delta t_1$ and $\delta t_2$ independently. As the clock errors are not known a priori, they must be modeled.

One modeling method is to treat the GPS and GLONASS clock errors separately, i.e., as two completely unrelated clock errors. This has the consequence of needing a second reference satellite, i.e., one reference satellite for GPS and one reference satellite for GLONASS. This has two adverse consequences: the overdetermination is worse, and signals must be available from at least 6 satellites (at least 2 satellites for each GNSS) to obtain a kinematic RTK solution.

Data analyses have shown that the difference between the differential clock errors of the two GNSS stays fairly constant over time, and may be temperature dependent. This means with carrier phase measurements that steady state estimation is possible to the millimeter level. This has the advantage of quicker conversion of all estimation processes. FIG. 2B is a plot versus time of the difference $\Delta\delta t$ between clock-error biases $\delta t_1$ and $\delta t_2$. In contrast to the large variation of $\delta t_1$ and $\delta t_2$, the inter-GNSS bias $\Delta\delta t$ is consistent from epoch to epoch, varies over a range corresponding to millimeters of error, and is correlated with temperature of the receiver hardware. Embodiments of the invention model $\delta t_1$ and $\Delta\delta t$ for a two-GNSS system. For a three-GNSS system, embodiments of the invention model $\delta t_1$ and two inter-GNSS biases $\Delta\delta t_2 = \delta t_1 - \delta t_2$ and $\Delta\delta t_3 = \delta t_1 - \delta t_3$.

Clock-error-difference modeling requires that the original receiver-clock errors have not been changed independently for GPS and GLONASS. This would happen if, e.g., in RTCM 2.3 format message types 20/21 the receiver clock errors would be determined independently and thereafter removed from the observations. In the past, some receivers required removal of the same receiver-clock error from GPS and GLONASS observables. The RTCM 2.3 standard includes no restrictions on the receiver-clock-error handling between GPS and GLONASS. However, existing reference-station software should handle this correctly, and other formats do not have this problem. Clock-error differences available from other sources do not address the differential clock errors. In any event, they are accurate only in the decimeter to meter level and are thus not applicable to carrier-phase positioning.

B. Frequency-Dependent Biases. Another problem with GLONASS is frequency dependent biases. These biases originate in the hardware, filters and other elements which are inherently frequency dependent. A (band-pass) filter always introduces frequency-dependent biases that can be derived mathematically. Another contribution is the fact that the absolute level of the ambiguities matters: the error in that absolute level also generates frequency-dependent errors. The hardware-related problems are greatly amplified when data from receivers of different manufacturers is combined, leading to unreliable fixes.

FIG. 3 shows a scenario with two GNSS (110, 320), a reference station 130 and a rover 140. One or more additional reference stations 150 may be used. GNSS 320 is an FDMA system such as GLONASS. There are multiple sources of frequency-dependent error, including: satellites of GNSS 320 each transmit on a different frequency; receiver filter hardware introduces frequency-dependent biases; signal-processing introduces frequency-dependent biases. Embodiments in accordance with this aspect of the invention model that frequency/wavelength-dependent error directly in the filter process. Initial testing shows reliability increases of at least an order of magnitude when data from receivers of different manufacturers are combined, enabling operations with a mixed system, e.g., a system having GNSS receivers from different manufacturers. Thus, an existing network of receivers from one manufacturer can be augmented with receivers from another manufacturer without degradation of results due to frequency-dependent biases.

C. Partial Fixing. Partial-fixing methods increase availability (reduce time-to-fix) and reliability by fixing subsets of the satellites tracked instead of the full set of satellites.

FIG. 4 shows a scenario with two or more GNSS 110, 320, 410 (such as GPS, GLONASS and GALILEO respectively), a reference station 130 and a rover 140. One or more additional reference stations 150 may be used. In the example of FIG. 4 GNSS 320 is an FDMA system, though FDMA is not a requirement; partial fixing will work for any one or more GNSS (e.g., for any one or any combination of GPS, GLONASS and the future GALILEO). Using data from signals of all satellites of multiple GNSS may be less desirable than using data from a subset of the GNSS or a subset of satellites within a GNSS. Correctly fixing a large number of ambiguities simultaneously often is less likely than fixing a smaller subset correctly. Embodiments in accordance with this aspect of the invention determine which combination(s) of GNSS/satellites is/are best, epoch by epoch.

Embodiments in accordance with the invention address the need for carrier-phase ambiguity resolution in current and future GNSS systems providing users with one or more frequencies, e.g. GPS, GLONASS and the future GALILEO.

Computationally-efficient techniques are employed on a realistic physical model for obtaining good approximations of the carrier phase ambiguities.

Embodiments in accordance with the invention may offer one or more benefits: ambiguities are fixed in a shorter period of time, such that centimeter-level positions can be provided faster; the reliability of ambiguity resolution is increased, minimizing the percentage of positions that are reported to have centimeter level accuracy while actually only being at the decimeter level or worse; and/or mixing of observables from GNSS receivers with substantially different hardware is enabled.

V. BRIEF DESCRIPTION OF DRAWINGS

FIG. 1 schematically illustrates a scenario using two GNSS having different clock-error biases which are modeled in accordance with some embodiments of the invention;

FIG. 2A is a typical plot versus time of clock-error biases of each of the two GNSS of FIG. 1;

FIG. 2B is a plot versus time of the difference between the clock-error biases of FIG. 2A;

FIG. 3 is shows a scenario with two GNSS, one of which is an FDMA system having frequency-dependent biases which are modeled in accordance with some embodiments of the invention;

FIG. 4 shows a scenario with two or more GNSS, in which partial-fixing methods may be employed in accordance with some embodiments of the invention;

FIG. 8A shows the use of a Kalman-filter state vector in a variant of the process of FIG. 5;

FIG. 8B shows the use of a Kalman-filter state vector in a variant of the process of FIG. 5 with two GNSS;

FIG. 16A shows an example of how partial fixing in accordance with some embodiments of the invention can reduce time-to-fix;

FIG. 16B shows an example of how partial fixing in accordance with some embodiments of the invention prevents fixing a validated-but-wrong full solution;

VI. MODES FOR CARRYING OUT THE INVENTION

A. Conceptual Overview

Figure 1:
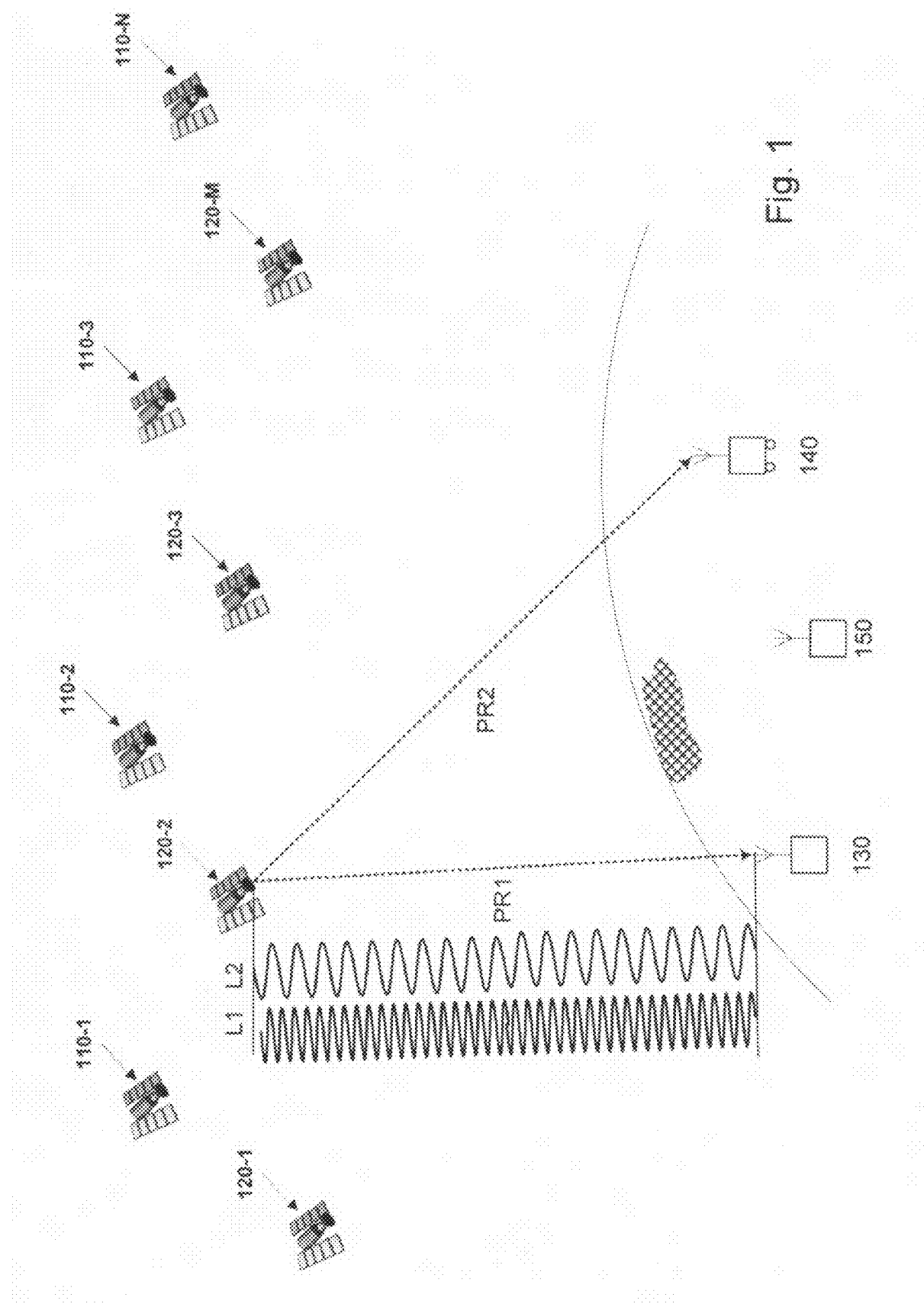

The well-known floating solution starts with defining the observation equations, i.e., how the GNSS observations (measurements represented in signal data) relate to the unknowns (states) to be determined.

The carrier phase observation equation used within this document is for the signal received by receiver r from satellite s which is a member of the GNSS $g_i$. The band of the carrier used (e.g. $L_1, L_2, L_5$) is denoted with b:

$$_b\lambda_b^s \Phi_r^s = R_r^s + \delta t_{g_i,r} - \delta t^s + T_r^s - {_bI_r^s} - {_b\lambda_b^s N_r^s} \tag{1}$$

Here, $R_r^s$ refers to the distance between the satellite s and the user receiver r:

$$R_r^s = |\vec{p}^s - \vec{p_r}| \tag{2}$$

where $\vec{p_s}$ is the position of the satellite s and $\vec{p_r}$ is the position of the user receiver r:

$$\vec{p_r} = \begin{pmatrix} x_r \\ y_r \\ z_r \end{pmatrix} \tag{3}$$

Also, $\delta t_{g_i,r}$ is the clock error of user receiver r for GNSS $g_i$, $T_r^s$ is the tropospheric error in the signal from satellite s at user receiver r, $_bI_r^s$ is the ionospheric error in the signal of band b from satellite s at user receiver r, and $_bN_t^s$ is the number of integer wavelengths of band b from satellite s to user receiver r.

Single differencing between the user receiver and the reference receiver data eliminates the satellite-specific clock error $\delta t^s$ and the GNSS satellite-specific clock errors which it includes:

$$_b\lambda^s \Delta_b \Phi_{r,q}^s = \Delta R_{r,q}^s + \Delta \delta t_{g_i,r,q} + \Delta T_{r,q}^s - \Delta_b I_{r,q}^s - {_b\lambda^s \Delta_b N_{r,q}^s} \tag{4}$$

Here, $$\Delta_b \Phi_{r,q}^2 = {_b\Phi_r^s} - {_b\Phi_q^s} \tag{5}$$
$$\Delta R_{r,q}^2 = R_r^s - R_q^s$$
$$\Delta \delta t_{g_i,r,q} = \delta t_{g_i,r} - \delta t_{g_i,q}$$
$$\Delta T_{r,q}^s = T_r^s - T_q^s$$
$$\Delta_b I_{r,q}^s = {_bI_r^s} - {_bI_q^s}$$
$$\Delta_b N_{r,q}^s = {_bN_r^s} - {_bN_q^s}$$

Usually the single-difference code (pseudorange) observation equation is implemented, too, to provide all available information to the filter for faster convergence:

$$\Delta_b \rho_{r,q}^s = \Delta R_{r,q}^s + \Delta \delta t_{g_i,r,q} + \Delta T_{r,q}^s + \Delta_b I_{r,q}^s \tag{6}$$

where $$\Delta_b \rho_{r,q}^s = {_b\rho_r^s} - {_b\rho_q^s}.$$

These observation equations define a Kalman filter via the state vector used:

$$\vec{x} = \begin{pmatrix} x_r \\ y_r \\ z_r \\ \Delta \delta t_{g_1,r,q} \\ \Delta \delta t_{g_2,r,q} \\ \vdots \\ \Delta \delta t_{g_{ng},r,q} \\ \Delta_b N_{r,q}^1 \\ \vdots \\ \Delta_b N_{r,q}^{ns} \\ \text{others}\ldots \end{pmatrix} \tag{7}$$

in which ng is the number of GNSS and ns is the number of satellites. The others entry refers to additional states used to model the remaining error sources. This can consist of ionospheric delay states, tropospheric delay state(s) and/or multipath states and more.

This can be extended to filtering multiple bands at the same time, i.e. for different bands $b \in \{b_1, \ldots, b_{n_b}\}$ simultaneously:

$$\vec{x} = \begin{pmatrix} x_r \\ y_r \\ z_r \\ \Delta \delta t_{g_1,r,q} \\ \Delta \delta t_{g_2,r,q} \\ \vdots \\ \Delta \delta t_{g_{ng},r,q} \\ \Delta_{b_1} N_{r,q}^1 \\ \vdots \\ \Delta_{b_{n_b}} N_{r,q}^1 \\ \Delta_{b_1} N_{r,q}^2 \\ \vdots \\ \Delta_{b_{n_b}} N_{r,q}^2 \\ \vdots \\ \Delta_{b_1} N_{r,q}^{ns} \\ \vdots \\ \Delta_{b_{n_b}} N_{r,q}^{ns} \\ \text{others}\ldots \end{pmatrix} \tag{8}$$

Example for 2 bands $L_1$ and $L_2$ and 5 satellites $s_1, \ldots, s_5$ from two GNSS $g_1$ and $g_2$. No others states are used here:

$$\vec{x} = \begin{pmatrix} x_r \\ y_r \\ z_r \\ \Delta \delta t_{g_1, r, q} \\ \Delta \delta t_{g_2, r, q} \\ \Delta_{L_1} N_{r,q}^{s_1} \\ \Delta_{L_2} N_{r,q}^{s_1} \\ \Delta_{L_1} N_{r,q}^{s_2} \\ \Delta_{L_2} N_{r,q}^{s_2} \\ \Delta_{L_1} N_{r,q}^{s_3} \\ \Delta_{L_2} N_{r,q}^{s_3} \\ \Delta_{L_1} N_{r,q}^{s_4} \\ \Delta_{L_2} N_{r,q}^{s_4} \\ \Delta_{L_1} N_{r,q}^{s_5} \\ \Delta_{L_2} N_{r,q}^{s_5} \end{pmatrix} \quad (9)$$

Figure 5:
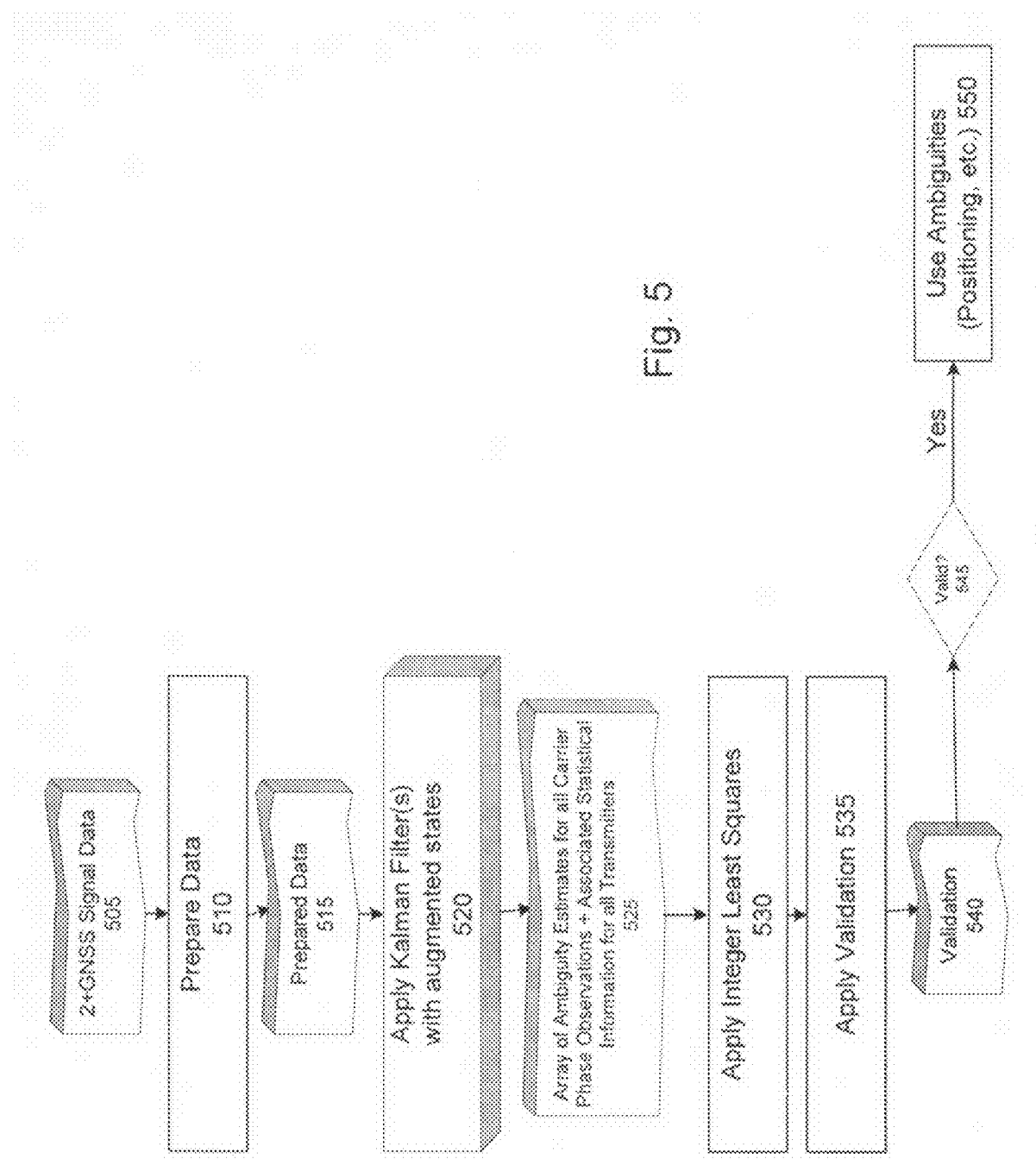
FIG. 5 is a flow chart of signal-data processing accordance with some embodiments of the invention.

FIG. 5 is a flow chart of signal-data processing in accordance with embodiments of the invention. A set of signal data 505 for an epoch from two or more GNSS is prepared at 510. The resulting prepared data set 515 is processed in one or more Kalman filters 520 having augmented states for clock-error-difference modeling and/or frequency-dependent-bias modeling as will be described. Filter(s) 520 produce an array of ambiguity estimates and associated statistical information 525. An integer-least-squares process 530 is applied to the array and its associated statistical information 525, and a validation process is performed at 535. A check of validity is made at 545. As indicated at 550, ambiguities determined to be valid can be used for various purposes known in the art, such as determining position of a rover.

B. Multiple GNSS Ambiguity Resolution

For the ambiguity resolution using multiple GNSS and a single-difference floating solution as described in the previous section, an additional technique is employed.

Due to the influence of the correlations between the estimated ambiguities of the two (or more) GNSS, simply computing the differences between the estimated single difference ambiguities does not generate a floating solution usable for ambiguity resolution.

Instead, the chosen value of the ambiguities for the reference satellites are handled as constraints to the floating solution. That means the effect of setting those ambiguities to a preselected value must be properly modeled.

1. The Pseudo-Observation Technique

This easy-to-implement technique handles the information about the chosen reference-satellite ambiguities as additional information to the floating solution filtering process. A disadvantage is that the floating solution is altered before fixing the ambiguities. To continuously improve the solution, a "copy" of the filter is used for preparation of ambiguity resolution, while an unaffected version of the filter continually works with the GNSS data stream.

For each GNSS included in the integer ambiguity resolution, the ambiguities $_{b}N_{r,q}^{r_i}$ of the reference satellite $r_i$ of $GNSS_j$ for every band are chosen. The determination of that value should be done with the information available from all filters. A straightforward way to get such an estimate is by using the single-differenced code-minus-carrier estimate:

$$_{b}\hat{N}_{r,q}^{r_i} = \text{Round}\left(\frac{\Delta_b \rho_{r,q}^{r_i}}{_b \lambda^s} - \Delta_b \Phi_{r,q}^{r_i}\right) \quad (10)$$

where Round(x) returns the nearest integer for x.

The observation equations used for this are simply:

$$\Delta_b N_{r,q}^{r_i} = {_b N_{r,q}^{r_i}} \quad (11)$$

In theory, this observation would be added with a variance of zero. However, in many implementations this is not possible. In that case, a very small number, e.g., $10^{-20}$ is used.

Figures 6, 7:
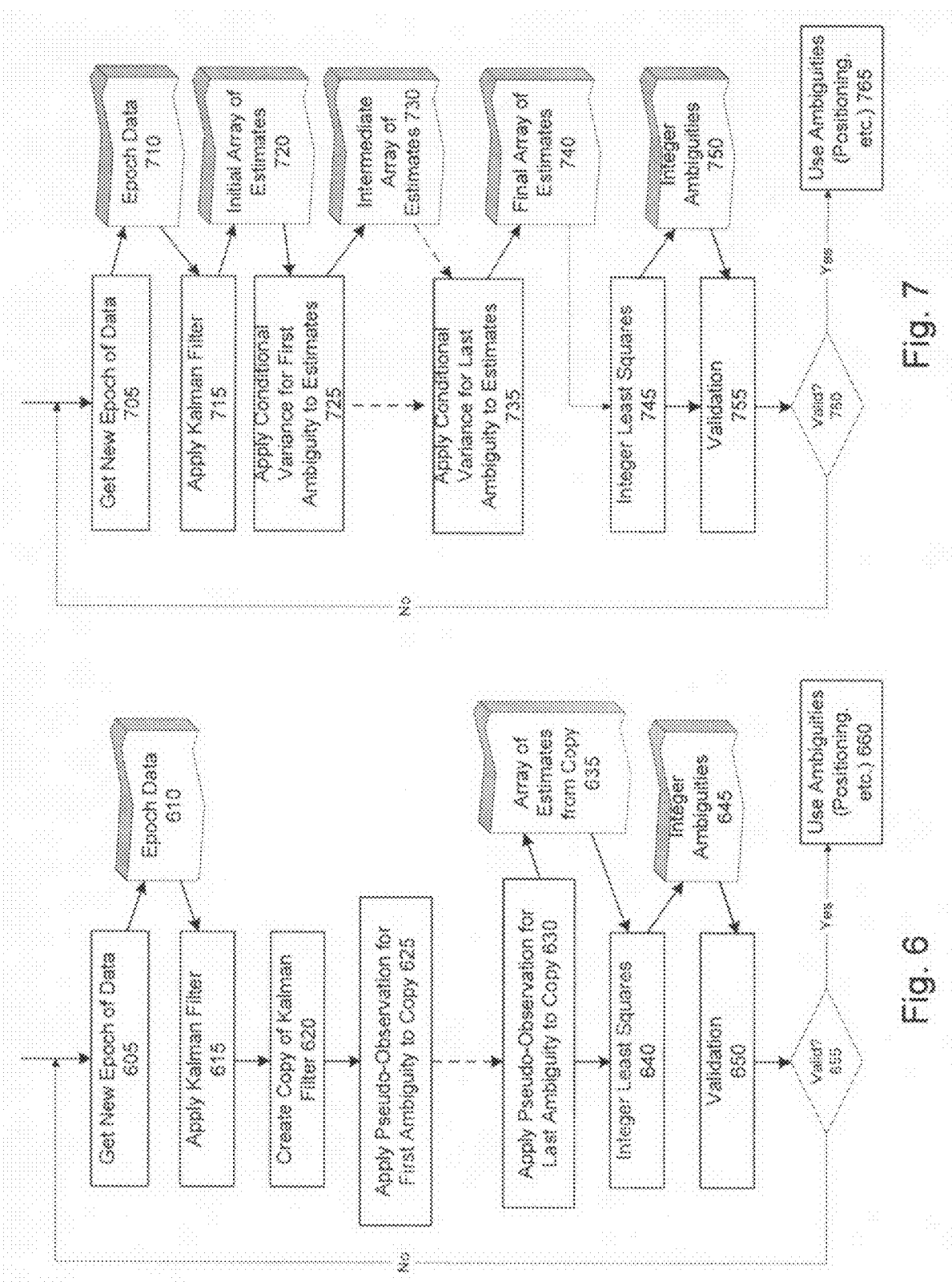
FIG. 6 is a flow chart illustrating a pseudo-observation technique in accordance with some embodiments of the invention.
FIG. 7 is a flow chart illustrating an embodiment of a conditional-variance technique in accordance with some embodiments of the invention.

FIG. 6 is a flow chart illustrating an embodiment of the pseudo-observation technique. At 605, a new epoch of data 610 is obtained. At 615, a Kalman filter is applied to data 610. At 620, a copy of the Kalman filter is prepared. At 625, a pseudo-observation for the first ambiguity is applied to the copy. This is repeated for each of the ambiguities in turn until, at 630, a pseudo-observation for the last ambiguity is applied to the copy. The result is an array of estimates 635 from the copy. At 640 an integer-least-squares process is applied to the array of estimates 635 to produce an array of integer ambiguities 645. At 650 a validation process is applied. At 655 a check is made whether process 650 has validated the integer ambiguities. If not valid, the process is re-started with a fresh epoch of data. If valid, integer ambiguities 645 are considered usable, e.g., for position determination at 660.

2. The Conditional Variance Technique

This technique avoids affecting the floating-solution filter by directly manipulating the single difference floating solution results.

With C being the variance/covariance matrix of the floating solution $\vec{N}$, the constraint solution is computed by iterating over all ambiguities $j_1, \ldots, j_k$ that have to be set to a fixed value:

$$C(0) = C \quad (12)$$
$$\vec{N}(0) = \vec{N}$$
$$C(i+1) = C(i) - \frac{1}{C(i)^{\langle j_i, j_i \rangle}} \cdot C(i)^{\langle j_i \rangle T} \cdot C(i)^{\langle j_i \rangle}$$
$$\vec{N}(i+1) = \vec{N}(i) + \frac{1}{C(i)^{\langle j_i, j_i \rangle}} \cdot C(i)^{\langle j_i \rangle T} \cdot \Delta_b \hat{N}_{r,q}^{r_{j_i}} - \vec{N}(i)^{\langle j_i \rangle}$$

$C(i)^{\langle j \rangle}$ denotes the j-th row of matrix $C(i)$ and $C(i)^{\langle j, j \rangle}$ is the j-th diagonal element of the same matrix. $\vec{N}(i)^{\langle j \rangle}$ is the j-th entry of vector $\vec{N}$. The final matrix $C(k)$ contains the final constraint variance/covariance matrix and $\vec{N}(k)$ is the final constraint floating solution.

FIG. 7 is a flow chart illustrating an embodiment of the conditional-variance technique. At 705, a new epoch of data 710 is obtained. At 715, a Kalman filter is applied to data 710 to produce an initial array of ambiguity estimates 720. At 725, a conditional variance is applied to the estimates for the first ambiguity, to produce an intermediate array of estimates 730. This is repeated for each of the ambiguities in turn until, at 735, a conditional variance is applied for the last ambiguity. The result is a final array of estimates 740. At 745 an integer-least-squares process is applied to the array of estimates 740 to produce an array of integer ambiguities 750. At 755 a validation process is applied. At 760 a check is made whether process 755 has validated the integer ambiguities. If not valid, the process is restarted with a fresh epoch of data. If valid, integer ambiguities 750 are considered usable, e.g., for position determination at 765.

3. Notes

Note 1): For the vector of estimated ambiguities, it also works to just subtract the reference ambiguities. Applying the constraint technique presented here is still the preferred (clean) way. However, for the variance/covariance matrix, use of the constraint technique is mandatory.

Note 2): This section might apply only if at least one of the GNSS is FDMA-type, e.g., GLONASS.

Note 3): In FAMCAR-like implementations this technique is only applicable to the geometric filter. FAMCAR is an abbreviation for "factorized multi-carrier ambiguity resolution" described for example in United States Patent Application Publication US 2005/0101248 A1, published May 12, 2005 and incorporated herein by this reference. The other FAMCAR filters (code, ionosphere, Q) must not be handled in this way but rather by the documented double-differencing technique.

C. Clock-Error Difference Modeling

In general, the time reference used in different GNSS will differ from each other. However, in differential processing this difference has to be known only to a certain degree in order to compute precise satellite positions for the simultaneous data measured in the receiver. For example, assuming the satellites are typically moving with $$1500 \frac{m}{s}$$

relative to the earth's surface, knowing the time reference within a tenth of a millisecond will result in an accuracy of 15 cm for the satellite positions which is usually accurate enough for most absolute and differential positioning techniques.

The effect of the time differences on the measurements will be the same for different receivers and thus cancel out when building the measurement differences between two receivers (single differences). This is equivalent to incorporating the inter-system time-differences into the satellite clock errors for non-differenced techniques.

Still, differences in the receiver hardware tracking the signals in different electronics and possibly using different frequencies (e.g., in FDMA GNSS such as GLONASS) will create another type of common-mode errors that are receiver-dependent and thus do not cancel out in single differences. These errors are called inter-GNSS receiver clock differences. These biases are very stable over time and mainly dependent on the receiver hardware temperature. Due to this property, they can be modeled as a constant bias term affecting all measurements.

In the documented existing algorithms, this problem is solved by introducing different receiver clock errors for each GNSS. This does not exploit the very nature of that error being more or less time-independent.

1. Approach

A better solution is to use the following modifications modeling inter-GNSS receiver clock error differences:

$$\Delta \delta t_{g_i,r,q} \rightarrow \Delta \delta t_{g_1,r,q} + (\Delta \delta t_{g_i,r,q} - \Delta \delta t_{g_1,r,q}) \tag{13}$$

Note: this transformation doesn't change the value of the clock errors but the way they are written down.

Further note that for the first GNSS ($g_1$) the second term cancels out so that the original definition remains:

$$\Delta \delta t_{g_1,r,q} \rightarrow \Delta \delta t_{g_1,r,q} + (\Delta \delta t_{g_1,r,q} - \Delta \delta t_{g_1,r,q}) = \Delta \delta t_{g_1,r,q} \tag{14}$$

For i>1, we define $$\Delta \partial t_{g_i,r,q} = \Delta \delta t_{g_i,r,q} - \Delta \delta t_{g_1,r,q} \tag{15}$$

Hence equation (13) becomes $$\Delta \delta t_{g_i,r,q} \rightarrow \Delta \delta t_{g_1,r,q} + \Delta \partial t_{g_i,r,q} \tag{16}$$

That is, the term $\Delta \partial t_{g_i,r,q}$ represents the difference between the clock errors of GNSS ($g_i$) and GNSS ($g_1$). Rather than modeling completely unrelated clock errors for each of the multiple GNSS, this approach models the clock error of one GNSS ($\Delta \delta t_{g_1,r,q}$) and the slowly-changing inter-GNSS clock-error difference ($\Delta \partial t_{g_i,r,q}$) between the clock errors of GNSS ($g_1$) and each of the other GNSS ($g_i$).

2. Observation Equations

Thus, the observation equations (4) and (6) for satellites of the GNSS other than GNSS 1 include the inter-GNSS clock-error difference term ($\Delta \partial t_{g_i,r,q}$) and become:

$$_b\lambda^s \Delta_b \Phi^s_{r,q} = \begin{array}{l} \Delta R^s_{r,q} + \Delta \delta t_{g_1,r,q} + \Delta \partial t_{g_i,r,q} + \\ \Delta T^s_{r,q} - \Delta_b I^s_{r,q} - _b\lambda^s \Delta_b N^s_{r,q} \end{array} \tag{17}$$

$$\Delta_b \rho^s_{r,q} = \Delta R^s_{r,q} + \Delta \delta t_{g_1,r,q} + \Delta \partial t_{g_i,r,q} + \Delta T^s_{r,q} + \Delta_b I^s_{r,q} \tag{18}$$

and for satellites s of GNSS 1, equations (4) and (6) are kept unchanged:

$$_b\lambda^s \Delta_b \Phi^s_{r,q} = \Delta R^s_{r,q} + \Delta \delta t_{g_1,r,q} + \Delta T^s_{r,q} - \Delta_b I^s_{r,q} - _b\lambda^s \Delta_b N^s_{r,q} \tag{19}$$

$$\Delta_b \rho^s_{r,q} = \Delta R^s_{r,q} + \Delta \delta t_{g_1,r,q} + \Delta T^s_{r,q} + \Delta_b I^s_{r,q} \tag{20}$$

3. State Vector

The new Kalman-filter state vector is then defined by:

$$\vec{x} = \begin{pmatrix} x \\ y \\ z \\ \Delta \delta t_{g_1,r,q} \\ \Delta \partial t_{g_2,r,q} \\ \vdots \\ \Delta \partial t_{g_2,r,q} \\ \Delta_b N^1_{r,q} \\ \vdots \\ \Delta_b N^{ns}_{r,q} \\ others \dots \end{pmatrix} \tag{21}$$

FIG. 8A shows the use of this Kalman-filter state vector in a variant of the process of FIG. 5. In addition to the clock-error states $\Delta \delta t_{g_1,r,q}$ for GNSS1 indicated at 810, Kalman filter 520A of FIG. 8A includes inter-GNSS clock-error-difference states for the other GNSS, e.g., $\Delta\delta t_{g_2,r,q}, \ldots, \Delta\delta t_{g_{ng},r,q}$, as indicated at 815 and 820.

For the example (9) with 2 bands $L_1$ and $L_2$ and 5 satellites $s_1, \ldots, s_5$ from two GNSS $g_1$ and $g_2$ as before:

$$\vec{x} = \begin{pmatrix} x_r \\ y_r \\ z_r \\ \Delta\delta t_{g_1,r,q} \\ \Delta\delta t_{g_2,r,q} \\ \Delta_{L_1} N_{r,q}^{s_1} \\ \Delta_{L_2} N_{r,q}^{s_1} \\ \Delta_{L_1} N_{r,q}^{s_2} \\ \Delta_{L_2} N_{r,q}^{s_2} \\ \Delta_{L_1} N_{r,q}^{s_3} \\ \Delta_{L_2} N_{r,q}^{s_3} \\ \Delta_{L_1} N_{r,q}^{s_4} \\ \Delta_{L_2} N_{r,q}^{s_4} \\ \Delta_{L_1} N_{r,q}^{s_5} \\ \Delta_{L_2} N_{r,q}^{s_5} \end{pmatrix} \quad (22)$$

In principle, the previously-given Kalman filter state vector is just modified by replacing the clock-error term for GNSS 2 ($\Delta\delta t_{g_2,r,q}$) with the inter-GNSS clock-error difference term ($\Delta\delta t_{g_2,r,q}$).

FIG. 8B shows the use of this Kalman-filter state vector in a variant of the process of FIG. 5 having two GNSS. In addition to the clock-error states $\Delta\delta t_{g_1,r,q}$ for GNSS1 indicated at 830, Kalman filter 520BA of FIG. 8B includes inter-GNSS clock-error-difference states for the other GNSS, e.g., $\Delta\delta t_{g_2,r,q}$ as indicated at 835.

Figure 9:
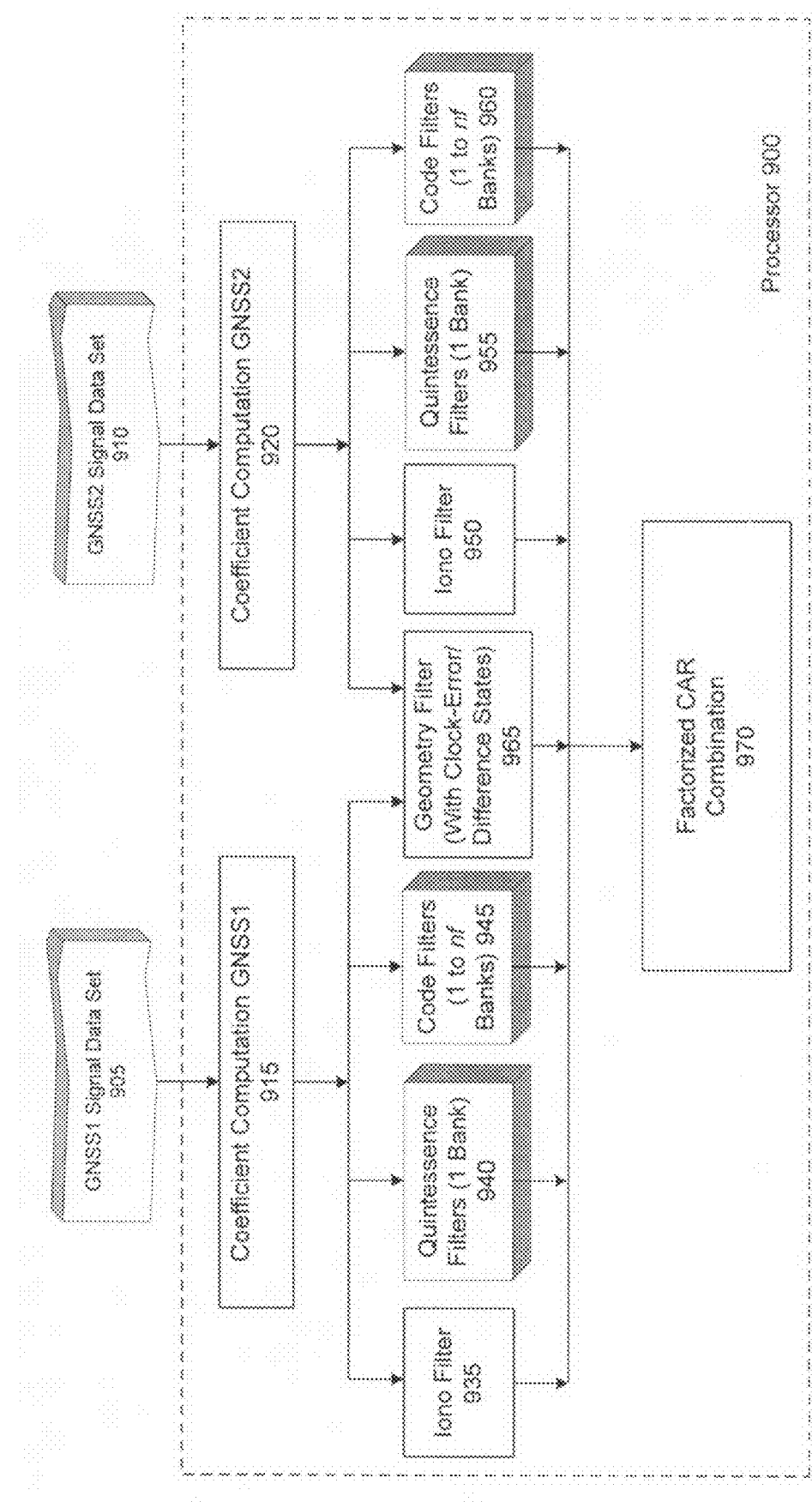
FIG. 9 is a block diagram of an apparatus for processing multi-GNSS with factorized carrier-ambiguity-resolution filters in accordance with some embodiments of the invention.
Figure 10:
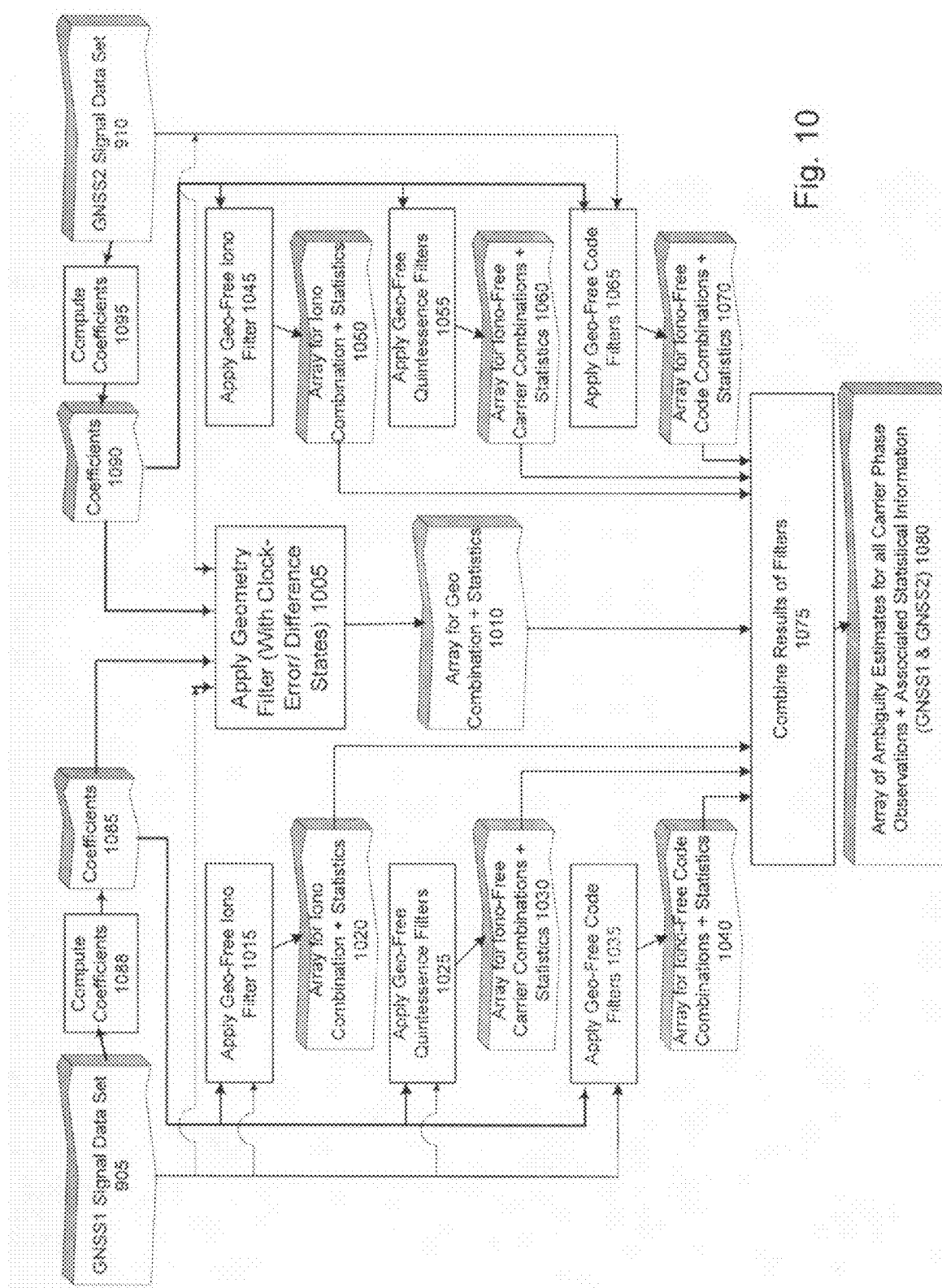
FIG. 10 is a flow chart of factorized carrier-ambiguity-resolution processing corresponding to FIG. 9.

FIG. 9 is a block diagram of an apparatus for processing multi-GNSS with factorized carrier-ambiguity-resolution filters in accordance with embodiments of the invention. Processing is as described in US 2005/0101248A1, except that the geometry filter 965 is modified as in FIG. 8B to have a state $\Delta\delta t_{g_1,r,q}$ for GNSS1 and a state $\Delta\delta t_{g_2,r,q}$ representing the clock-error-difference between GNSS2 and GNSS1. FIG. 10 is a flow chart of factorized carrier-ambiguity-resolution processing corresponding to FIG. 9.

4. Time Update

There are two things remaining for the Kalman filter definition: the time update and the initial covariance matrix. In one version of this method, a default behavior is used: the inter-GNSS clock-error difference states ($\Delta\delta t_{g_i,r,q}$) are considered to be constant and the initial value is assumed to be unknown.

To handle potential changes of the clock difference over time, for example caused by changing hardware temperature of the user or reference receiver, a noise input can be applied to the inter-GNSS clock-error difference state(s). One of the well-known techniques from the Kalman filter area is the noise input for a Random Walk process. Another possibility is defining the clock state(s) as so-called First Order Gauss-Markov Processes GM(1).

If the primary GNSS $g_1$ has no observations available, the filtering process can become numerically unstable. The clock difference states are defined relative to the first GNSS clock, so if that's not determined the difference can become badly determined as well. As a solution, in another implementation of the method an initial variance can be assigned to the clock error difference states, together with an initial value of zero. In another implementation, the clock error of the first system can be initialized with zero and a limited initial variance. The clock-error difference modeling techniques described here are applicable to processing of satellite-signal observations of any two or more GNSS, e.g., GPS+GLONASS, GPS+GALILEO, GLONASS+GALILEO, GPS+GLONASS+GALILEO.

D. Frequency Dependent Bias Modeling

The receiver hardware will always contain frequency dependent biases. One source of these biases is the RF and IF filters. Filtering always results in frequency dependent biases.

Also, as the filter hardware is never perfectly matching the theoretical models, more biases result. FDMA GNSS (e.g., GLONASS) use different frequencies for different satellites. As a consequence, different satellites will have different biases. These biases cannot cancel out when building receiver-receiver differences (single differences).

Also, FDMA signals require additional techniques for ambiguity resolution. The reason is that the double differences of FDMA signals are no longer invariant against changes in the absolute ambiguity level.

1. Approach

Starting again with equation (4):

$$_b\lambda^s \Delta_b \Phi_{r,q}^s = \Delta R_{r,q}^s + \Delta\delta t_{g_i,r,q} + \Delta T_{r,q}^s - \Delta_b I_{r,q}^s - {}_b\lambda^s \Delta_b N_{r,q}^s \quad (23)$$

For the following derivations the ionospheric and tropospheric error are omitted (or subsumed under the geometric range), resulting in the simplified carrier phase observation equation:

$$_b\lambda^s \Delta_b \Phi_{r,q}^s = \Delta R_{r,q}^s + \Delta\delta t_{g_i,r,q} - {}_b\lambda^s \Delta_b N_{r,q}^s \quad (24)$$

The double difference formulation (i.e., differencing between satellite s and reference satellite t) removes the receiver clock error from the equation and results in $$_b\lambda^s \Delta_b \Phi_{r,q}^s - {}_b\lambda^t \Delta_b \Phi_{r,q}^t = \Delta\nabla R_{r,q}^{s,t} - {}_b\lambda^s \Delta_b N_{r,q}^s + {}_b\lambda^t \Delta_b N_{r,q}^t \quad (25)$$

where $\Delta\nabla R_{r,q}^{s,t} = \Delta R_{r,q}^s - \Delta R_{r,q}^t$ is the difference of single differences between satellites, the double difference for the geometric distances.

Due to unmodeled biases, only the double difference integer ambiguities $\Delta\nabla_b N_{r,q}^{s,t}$ can be determined, e.g. by applying integer least squares techniques. The single difference integer ambiguities $\Delta_b N_{r,q}^s$ cannot reliably be fixed. Thus, the equation is reformulated using the identity $ax-by=a(x-y)+(a-b)y$:

$$_b\lambda^s \Delta_b \Phi_{r,q}^s - {}_b\lambda^t \Delta_b \Phi_{r,q}^t = \quad (26)$$
$$\Delta\nabla R_{r,q}^{s,t} - {}_b\lambda^s \Delta\nabla_b N_{r,q}^s - ({}_b\lambda^s - {}_b\lambda^t)\Delta_b N_{r,q}^t$$

Now, the knowledge of the single difference ambiguity $\Delta_b N_{r,q}^t$ for satellite t becomes important.

Note: For the non-FDMA case $_b\lambda^s = {_b\lambda^t}$, hence this additional term vanishes.

Any estimated value $\Delta_b \tilde{N}_{r,q}^t$—for example derived from code measurements—will always contain an error $$\epsilon \Delta_b N_{r,q}^t = \Delta_b \tilde{N}_{r,q}^t - \Delta_b N_{r,q}^t \tag{27}$$

Especially its integer value cannot be reliably resolved. It can be easily seen that a wavelength-dependent error term for satellite s has been introduced:

$$_b\epsilon^{(s)} = ({_b\lambda^s} - {_b\lambda^t})\epsilon \Delta_b N_{r,q}^t \tag{28}$$

This error is dependent on the wave length difference $_b\lambda^s - {_b\lambda^t}$ of satellite s to the reference satellite t as well as the error $\epsilon \Delta_b N_{r,q}^t$ of the single difference carrier phase ambiguity for the reference satellite carrier phase measurement. To solve the observation equations, not only the double-difference integer ambiguities have to be solved, but a good estimate for the single difference ambiguity of the reference satellite is needed.

2. Observation Equations

The reference ambiguity can be reformulated as a general wavelength/frequency dependent factor $_b\omega_{g_i,r,q}$ that is common for each (FDMA) GNSS $g_i$ and band b. The first implementation uses the difference to a reference wavelength $_b\lambda_{g_i}^0$ of GNSS $g_i$. In terms of the floating solution, the carrier-observation equations become:

$$_b\lambda^s \Delta_b \Phi_{r,q}^s = \Delta R_{r,q}^s + \Delta \delta t_{g_i,r,q} + ({_b\lambda^s} - {_b\lambda_{g_i}^0}){_b\omega_{g_i,r,q}} - {_b\lambda^s}\Delta_b N_{r,q}^s \tag{29}$$

A second implementation uses the wavelength of each satellite directly to determine a coefficient $_b\Omega_{g_i,r,q}$ equivalent to the ambiguity-estimation error.

$$_b\lambda^s \Delta_b \Phi_{r,q}^s = \Delta R_{r,q}^s + \Delta \delta t_{g_i,r,q} + {_b\lambda^s}{_b\Omega_{g_i,r,q}} - {_b\lambda^s}\Delta_b N_{r,q}^s \tag{30}$$

The pseudorange observation equations remain unchanged.

3. State Vector

The new Kalman-filter state vector is then defined for one FDMA-type GNSS $g_i$ for the first implementation:

$$\vec{x} = \begin{pmatrix} x \\ y \\ z \\ \Delta \delta t_{g_1,r,q} \\ \Delta \delta t_{g_2,r,q} \\ \vdots \\ \Delta \delta t_{g_{ng},r,q} \\ _b\omega_{g_i,r,q} \\ \Delta_b N_{r,q}^1 \\ \vdots \\ \Delta_b N_{r,q}^{ns} \\ \text{others} \ldots \end{pmatrix} \tag{31}$$

and for the second implementation:

$$\vec{x} = \begin{pmatrix} x \\ y \\ z \\ \Delta \delta t_{g_1,r,q} \\ \Delta \delta t_{g_2,r,q} \\ \vdots \\ \Delta \delta t_{g_n,r,q} \\ _b\Omega_{g_i,r,q} \\ \Delta_b N_{r,q}^1 \\ \vdots \\ \Delta_b N_{r,q}^{ns} \\ \text{others} \ldots \end{pmatrix} \tag{32}$$

As will be shown in section VI F, this will also model any frequency dependent error caused by the receiver hardware.

Figure 11:
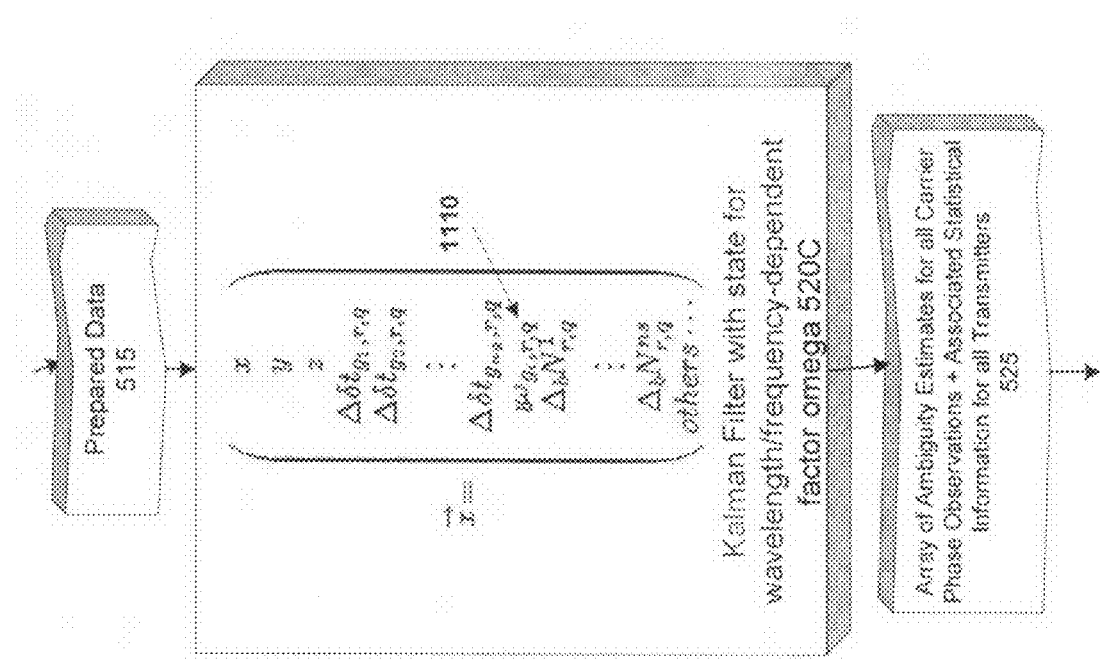
FIG. 11 shows the use of a Kalman-filter state vector for a first implementation in a variant of the process of FIG. 5 having a state for a wavelength/frequency-dependent factor.

FIG. 11 shows the use of a Kalman-filter state vector for the first implementation in a variant of the process of FIG. 5. Kalman filter 520C of FIG. 11 includes a wavelength/frequency-dependent factor $_b\omega_{g_i,r,q}$ as state 1110.

Figure 12:
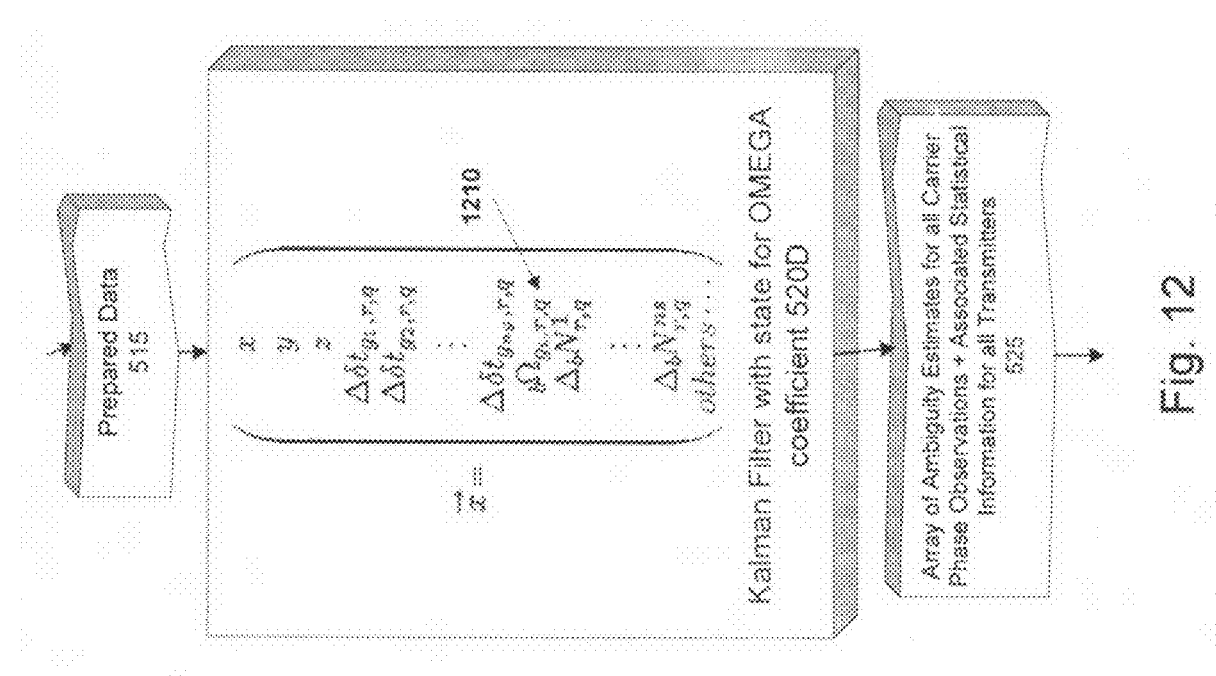
FIG. 12 shows the use of a Kalman-filter state vector for a second implementation in a variant of the process of FIG. 5 having a state for an ambiguity-estimation error.

FIG. 12 shows the use of a Kalman-filter state vector for the second implementation in a variant of the process of FIG. 5. Kalman filter 520D of FIG. 12 includes a coefficient $_b\omega_{g_i,r,q}$ equivalent to the ambiguity-estimation error as state 1210.

Figure 13:
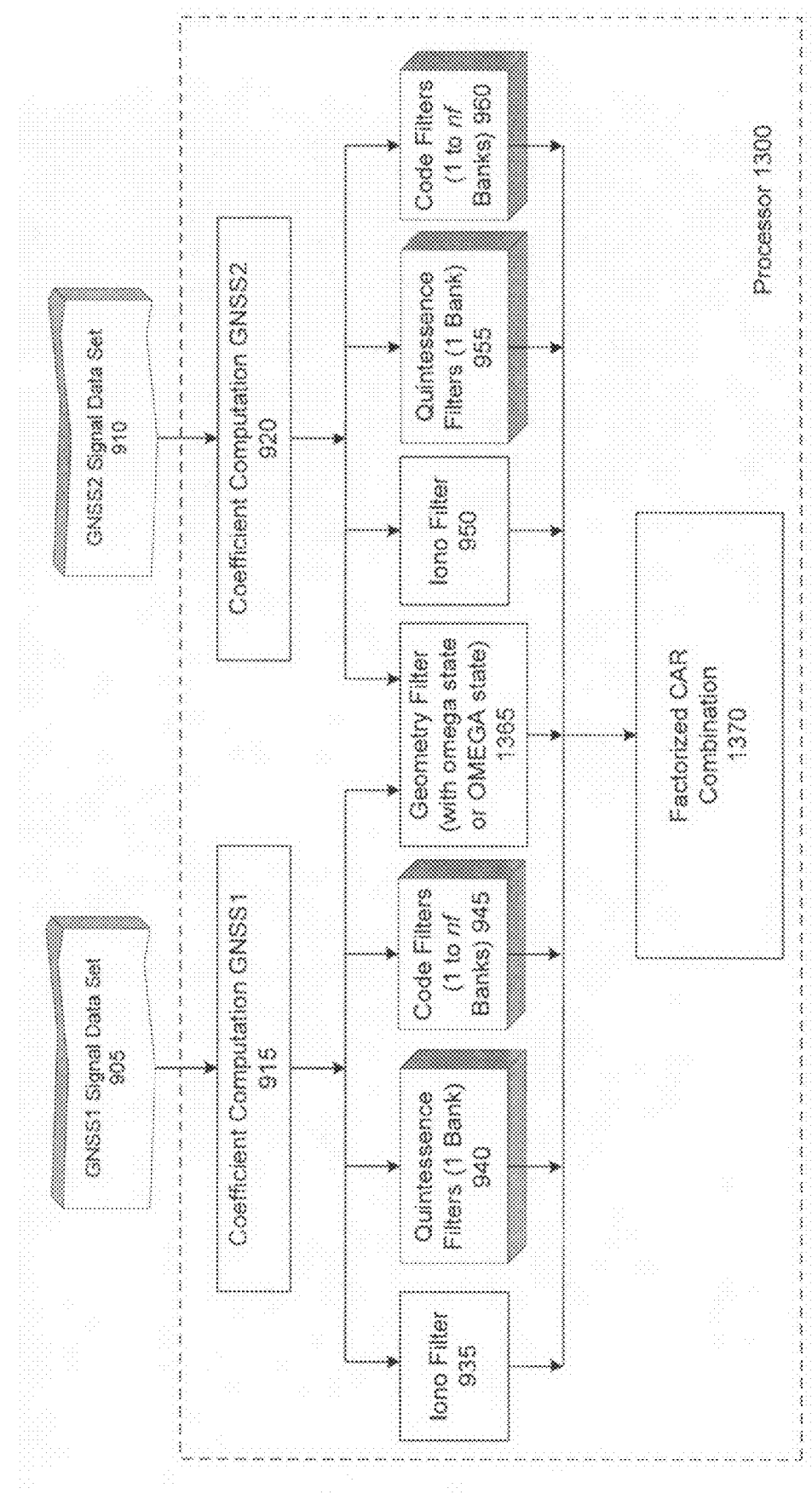
FIG. 13 is a block diagram of an apparatus for processing multi-GNSS with factorized carrier-ambiguity-resolution filters in accordance with some embodiments of the invention.
Figure 14:
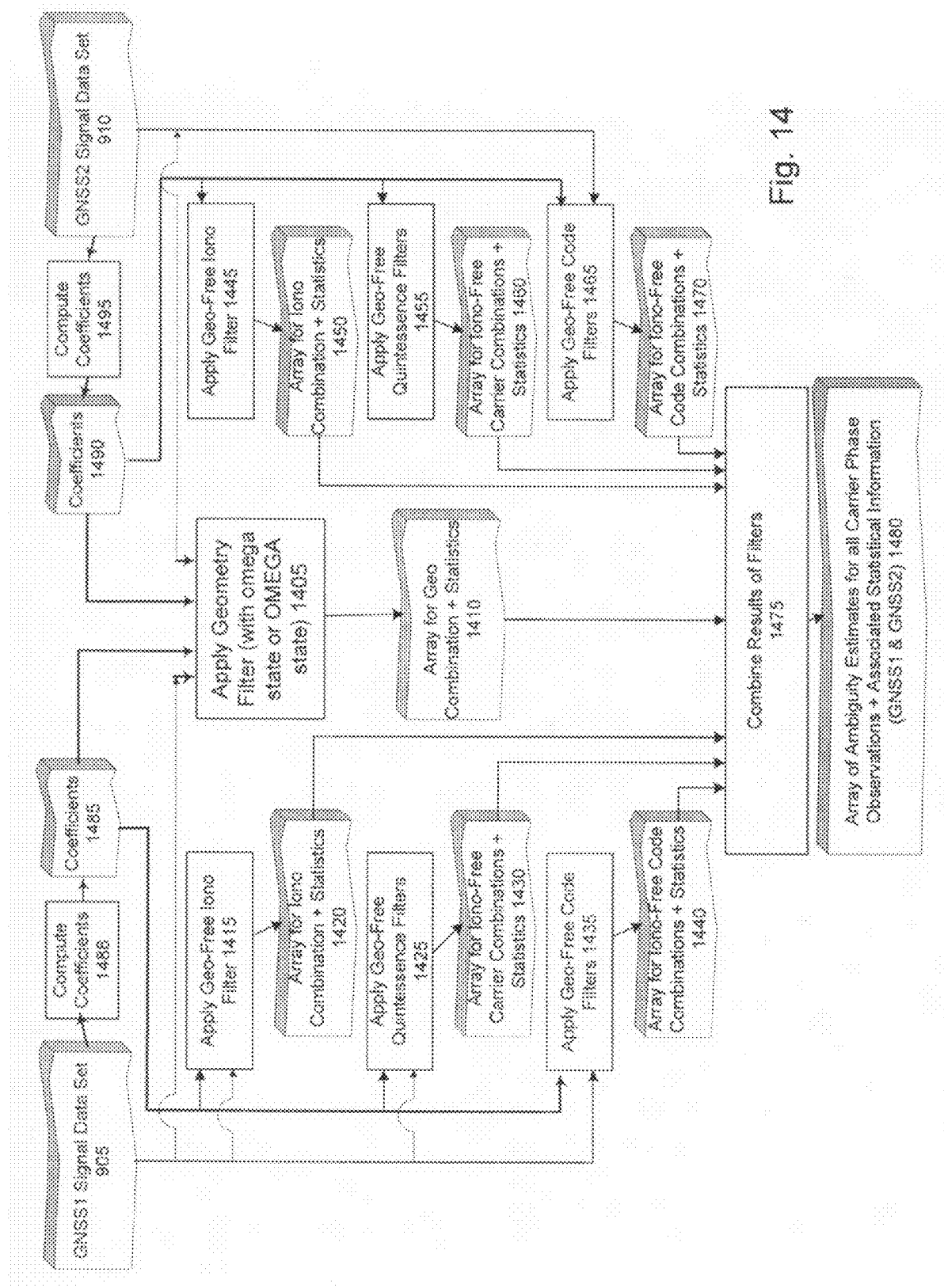
FIG. 14 is a flow chart of factorized carrier-ambiguity-resolution processing corresponding to FIG. 13.

FIG. 13 is a block diagram of an apparatus for processing multi-GNSS with factorized carrier-ambiguity-resolution filters in accordance with embodiments of the invention. Processing is as described in US 2005/0101248A1, except that the geometry filter 1365 is modified as in FIG. 11 to have as one of its states a wavelength/frequency-dependent factor $_b\omega_{g_i,r,q}$ or as in FIG. 12 to have as one of its states a coefficient $_b\Omega_{g_i,r,q}$ equivalent to the ambiguity-estimation error. FIG. 14 is a flow chart of factorized carrier-ambiguity-resolution processing corresponding to FIG. 13.

E. Analysis of the Impact of the Error in the Reference Ambiguity

To analyze what "good" means in this special case, the error is given in terms of the carrier frequency differences:

$$\epsilon^s = \left(\frac{c}{f^s} - \frac{c}{f^t}\right) \Delta N_{r,q}^t = \frac{f^s - f^t}{f^s} {_b\lambda^t} \Delta N_{r,q}^t \tag{33}$$

So the error is proportional to the relative carrier frequency difference $$\frac{f^s - f^t}{f^s}$$

times the error in the absolute single difference reference ambiguity in units of length $_b\lambda^t \Delta N_{r,q}^t$.

As an example for the Russian GLONASS system L1 carrier frequency, the frequencies for the satellites are given by the formula $$f^s = 1602 \cdot 10^6 + k^s \cdot 0.5625 \cdot 10^6 \tag{34}$$

where k is a channel number given for a specific satellite in the range of 0 to 12. The relative carrier frequency can be approximated quite well as:

$$\frac{f^s - f^t}{f^s} \approx (k^s - k^t)\frac{0.5625 \cdot 10^6}{1602 \cdot 10^6} = \frac{k^s - k^t}{2848} \quad (35)$$

This means that for the maximum channel difference $k^s-k^t$ of 12 the additional error introduced will be 4.2 mm per meter of error in the determination of the absolute single difference reference ambiguity.

F. Equivalence Principle

Frequency-dependent and wavelength-dependent biases are equivalent. This can be seen in the formulation:

$$\epsilon_f = \epsilon_{f0} + \alpha(f - f0) = \epsilon_{f0} + \alpha\left(\frac{c}{\lambda_0 + \Delta\lambda} - \frac{c}{\lambda_0}\right) \quad (36)$$

The first order Taylor series including the exact quadratic residual term yields $$\epsilon_f^{(lin)} = \epsilon_{f0} - \frac{c\alpha}{\lambda_0^2}\Delta\lambda + \frac{c\alpha}{\lambda_0^2}\frac{1}{\lambda_0}\Delta\lambda^2 \quad (37)$$

Thus, by using the linear term only—i.e. converting the frequency dependent bias into a wave length dependent bias—the additional quadratic error corresponds to the quotient of squared wave length difference to absolute wave length. For GLONASS, this means an attenuation by a factor of at least 300. This means, the residual term can be neglected for all practical purposes.

G. Application to Other Floating Solutions

The techniques described in the previous sections VI B, VI C and VI D for a single carrier are also applicable, if the filter is not formulated in directly observed carrier phase and pseudorange observables $_b\phi_r^s$ and $_b\rho_r^s$.

For example, the L1 carrier (covered by the equations above) can be substituted with any ionosphere-free carrier combination a1*L1+a2*L2=Lc. As in the factorized carrier-ambiguity resolution techniques of United States Patent Application Publication US 2005/0101248 A1, the minimum-error combination can be used instead of L1, L2 or L5.

Thus, the benefits hold if the carrier phase used for nb bands $b_1, \ldots, b_k$ is a combination $$_{\vec{a}}\Phi_r^s = \sum_{k=1}^{nb} a_k \cdot {}_{b_k}\Phi_r^s \quad (38)$$

with the effective wavelength $$_{\vec{a}}\lambda^s = \left(\sum_{k=1}^{nb} \frac{a_k}{b_k \lambda^s}\right)^{-1} \quad (39)$$

and/or the code used is a combination.

$$_{\vec{d}}\rho_r^s = \sum_{k=1}^{nb} d_k \cdot {}_{b_k}\rho_r^s \quad (40)$$

All methods are used identical to the methods outlined above.

H. Partial Fixing

In principle, ambiguity resolution should always become more reliable and quicker with an increasing number of satellites used in the solution. However, two effects counteract on this general rule:
  The more satellites are included, the more ambiguities must be resolved correctly for all satellites.
  When combining data from different GNSS with very different characteristics on the quality and reliability of the data the possibility exists that the data from the "good" GNSS will be compromised by the data of the "bad" GNSS.

The expectation of GNSS users is that adding another GNSS to the receiver (and thus adding cost to the user) will always result in better performance than for a single GNSS system. This will be judged by all possible criteria such as reliability, availability, accuracy and time-to-fix.

To work around the limitations mentioned above, embodiments of the present invention use partial fixing methods. They are also very helpful in processing data of difficult environments such as canopy.

1. Algorithm Examples

Some embodiments in accordance with the invention use the following algorithm for partial fixing of ambiguities:
1. Perform a full search and save the search results.
2. (Optional) If option enabled and GLONASS satellites tracked disable all GLONASS ambiguities and search only the GPS ambiguities. Save these search results.
3. (Optional) If option enabled and GLONASS satellites tracked disable the ambiguities for each GLONASS satellite in turn and search the remaining ambiguities. Save each of these search results.
4. (Optional) If option enabled and GLONASS satellites tracked disable all GPS ambiguities and search only the GLONASS ambiguities. Save these search results.
5. (Optional) If option enabled and GLONASS satellites tracked disable the ambiguities for each GPS satellite in turn and search the remaining ambiguities. Save each of these search results.
6. Find the search results that passed validation and with the highest ratio probability from steps 2 to 5.
7. If no search results are available from step 6 then partial searching has failed.
8. If search results are available from step 6 then compare the ambiguities with the ambiguities from the full search in step 1.
9. If all ambiguities are the same then accept the partial search results
10. If any ambiguities are different then reject the partial search results
   Steps 2 to 5 are optionally enabled/disabled by the processing application. For example, a processing application may enable only one or any desired combination of steps 2-5, such as steps 2 and 3 only.
   Other embodiments in accordance with the invention use the following algorithm(s):
   a. Doing a complete solution
   b. Applying partial fixing only if complete solution fails
   c. Applying partial fixing always
   d. Partially fixing by excluding all satellites of a (one some) GNSS
   e. Partially fixing by disabling a subset of all satellites (one or more)
   f. Combination of d. and e.

2. Disabling Satellites

There are multiple possibilities to disable (i.e., exclude) a satellite subset from the total result. A simple approach is to remove the parts of the solution from the floating solution before applying the integer-least-squares search. Then removing satellites from the solution is equivalent to just removing the rows and columns of the variance/covariance matrix and the entries of the floating solution vector for the ambiguities of those removed satellites. If the ambiguity estimates $\vec{N}$ are given as:

$$\vec{N} = \begin{pmatrix} \Delta_{b_1} N_{r,q}^1 \\ \vdots \\ \Delta_{b_{n_b}} N_{r,q}^1 \\ \vdots \\ \Delta_{b_1} N_{r,q}^{j-1} \\ \vdots \\ \Delta_{b_{n_b}} N_{r,q}^{j-1} \\ \Delta_{b_1} N_{r,q}^{j} \\ \vdots \\ \Delta_{b_{n_b}} N_{r,q}^{j} \\ \Delta_{b_1} N_{r,q}^{j+1} \\ \vdots \\ \Delta_{b_{n_b}} N_{r,q}^{j+1} \\ \vdots \\ \Delta_{b_1} N_{r,q}^{ns} \\ \vdots \\ \Delta_{b_{n_b}} N_{r,q}^{ns} \end{pmatrix} \quad (41)$$

and satellite j should be removed, the resulting data looks like this:

$$\vec{N}_{\setminus\{j\}} = \begin{pmatrix} \Delta_{b_1} N_{r,q}^1 \\ \vdots \\ \Delta_{b_{n_b}} N_{r,q}^1 \\ \vdots \\ \Delta_{b_1} N_{r,q}^{j-1} \\ \vdots \\ \Delta_{b_{n_b}} N_{r,q}^{j-1} \\ \Delta_{b_1} N_{r,q}^{j+1} \\ \vdots \\ \Delta_{b_{n_b}} N_{r,q}^{j+1} \\ \vdots \\ \Delta_{b_1} N_{r,q}^{ns} \\ \vdots \\ \Delta_{b_{n_b}} N_{r,q}^{ns} \end{pmatrix} \quad (42)$$

Correspondingly, for the corresponding covariance matrix C the rows and columns referring to the ambiguities of the excluded satellite(s) are removed. This removal of entries can be done on the single-differenced floating solution as well as on the double-differenced solution.

The latter has the disadvantage of not being able to exclude the reference satellite but requires less computing time.

Other possible implementations include running multiple floating solutions in parallel, one for each subset of excluded satellites. The solutions used for the subsets can then be taken directly from those filters.

Figure 15A:
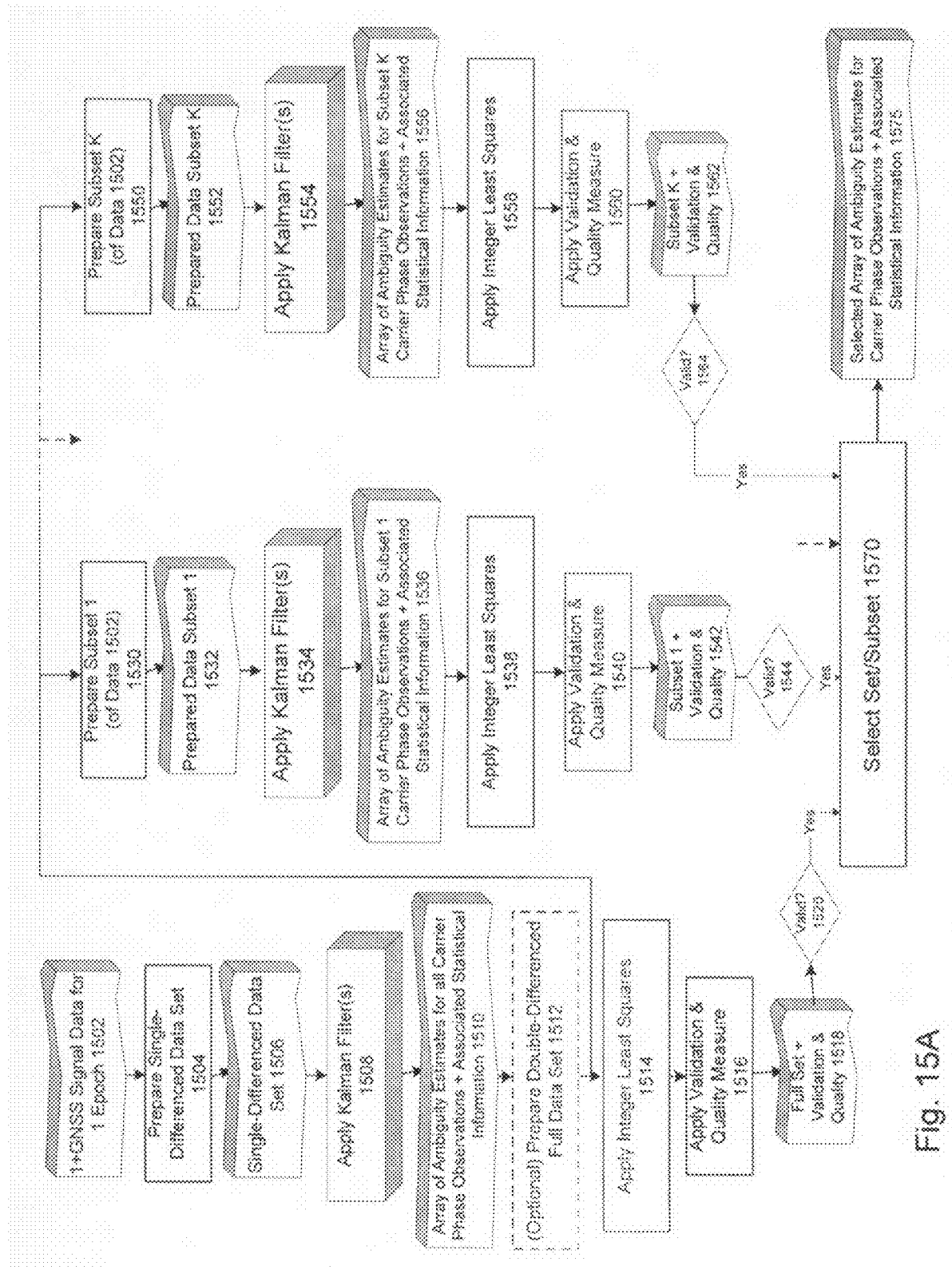
FIG. 15A is a flow chart of partial-fixing methods in accordance with some embodiments of the invention.

FIG. 15A is a flow chart of partial-fixing methods in accordance with embodiments of the invention. A set of GNSS signal data 1502 from one or more GNSS for an epoch is single-differenced at 1504. The resulting single-differenced data set 1506 is processed at 1508 in one or more Kalman filters to produce an array 1510 of ambiguity estimates for all carrier-phase observations and associated statistical information. At this stage, the data set may optionally be double-differenced as indicated at 1512. At 1514 an integer-least-squares process is applied to array 1510 (or the array resulting from optional double-differencing at 1514). At 1516, a validation process is applied and quality measures are determined as desired (or selected from the associated statistical information). The result is an array 1518 of ambiguity estimates corresponding to the full set of satellites with validation and quality measures. At 1520 a check is made whether the full set has been validated.

At 1530 a first subset 1532 is selected, e.g., by eliminating data from one GNSS or data from one or more satellites of a GNSS. Subset 1532 is processed at 1534 in one or more Kalman filters to produce an array 1536 of ambiguity estimates for the first subset. At 1538 an integer-least-squares process is applied to array 1536. At 1540, a validation process is applied and quality measures are determined as desired (or selected from the associated statistical information). The result is an array 1542 of ambiguity estimates corresponding to the first subset of satellites with validation and quality measures. At 1544 a check is made whether the first subset has been validated.

A similar process is performed for each subset of some number K of subsets. At 1550 subset K 1552 is selected, e.g., by eliminating data from one GNSS or data from one or more satellites of a GNSS. Subset 1552 is processed at 1554 in one or more Kalman filters to produce an array 1556 of ambiguity estimates for subset K. At 1558 an integer-least-squares process is applied to array 1556. At 1550, a validation process is applied and quality measures are determined as desired (or selected from the associated statistical information). The result is an array 1542 of ambiguity estimates corresponding to subset K of satellites with validation and quality measures. At 1544 a check is made whether the subset K has been validated.

At 1570, a determination is made about the set or subset(s) of satellites to be selected as "correct," resulting in a selected array 1575 of ambiguity estimates with associated statistical information. Various selection criteria may be used. Among other schemes, an array of ambiguities for a subset selected as correct may be augmented with ambiguities for satellites of other subsets. Non-limiting examples of the selection process are given below.

Figure 15B:
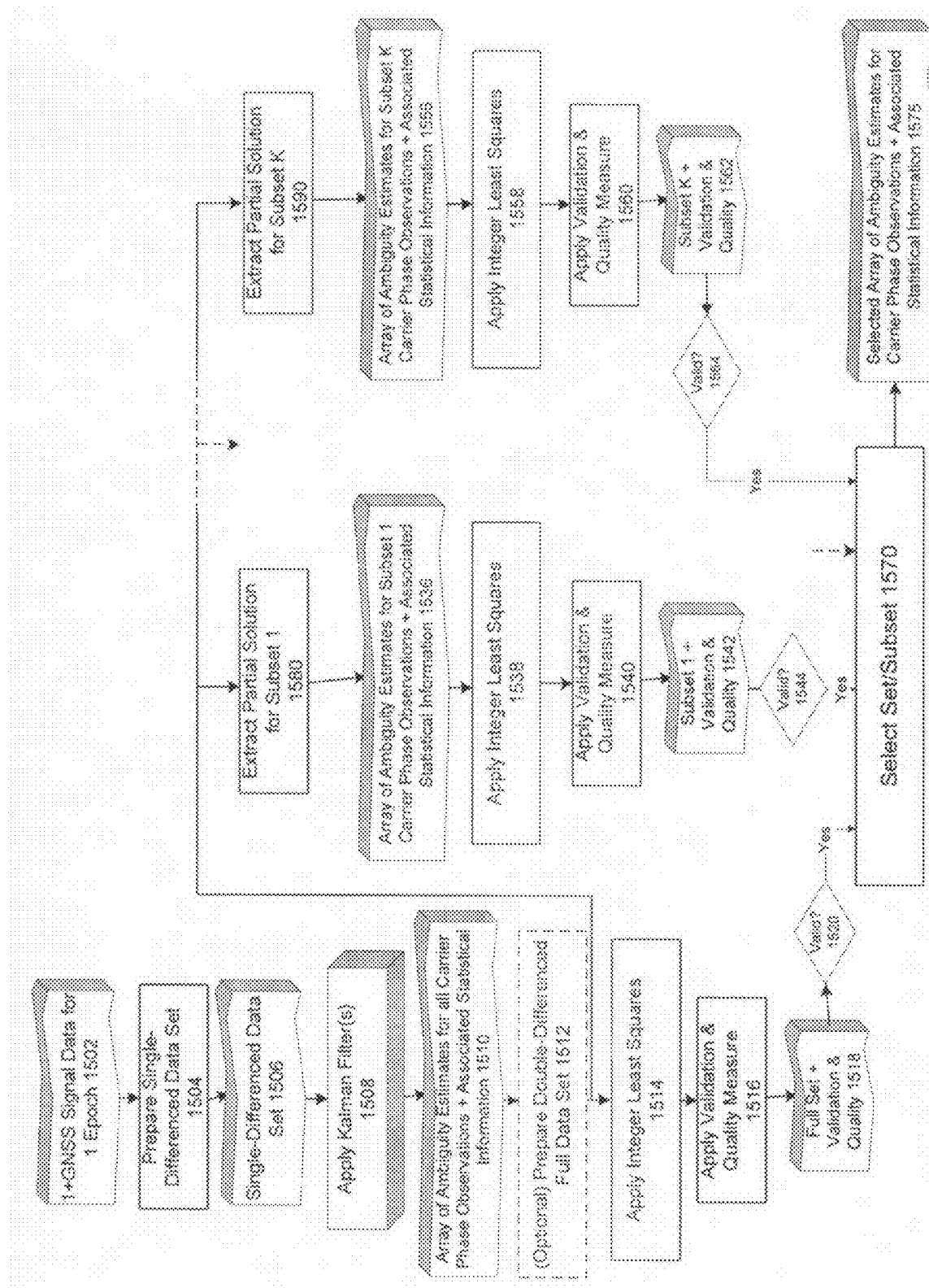
FIG. 15B is a flow chart of alternative partial-fixing methods in accordance with some embodiments of the invention.

FIG. 15B is a flow chart of alternative partial-fixing methods in accordance with embodiments of the invention. Rather than applying Kalman filter(s) (as at 1534 and 1554 in FIG. 15A), the method of FIG. 15B uses the technique of extracting a partial solution from array 1510 (or the resulting from optional double-differencing 1512), by crossing out columns and rows of data. Thus, at 1580 a partial solution for subset 1 is prepared by crossing out columns and rows of data for those satellites to be excluded from subset 1; and, at 1590 a partial solution for subset K is prepared by crossing out columns and rows of data for those satellites to be excluded from subset K.

3. Examples

The following section gives examples for possible results of partial fixing. It is assumed for purposes of these examples that successful validation results with a probability of at least 99.99%. For each satellite, the satellite id, the L1 ambiguity $N_1$ and the L2 ambiguity $N_2$ are specified. Solutions that could be validated are rendered in boldface font. Validated ambiguities that are not consistent between the validated sets are given in italics. The entries for satellites not included in a partial set are simply left empty.

The first example, shown in FIG. 16A, shows how partial fixing can reduce the time-to-fix by generating a validated ambiguity set in a situation where the traditional full solution cannot be validated.

The full set is not validated due to a probability of 99.20%. Still, the partial sets Part$_2$ and Part$_5$ are validated with respective probabilities of 99.99% and 100%. As the ambiguity results in those two sets are identical for the common satellites, fixing the ambiguities is possible. As for sets Part$_1$, Part$_4$, and Part$_6$, they contain solutions not consisted with the validated ones. However, as these partial sets have not been validated, they do not result in a complete rejection of the solution. In a first variant, set Part$_5$ is used as it has the highest probability. In another variant, the union of the results of sets Part$_2$ and Part$_5$ is fixed. This coincides with the complete result, thus allowing a full fix in a situation where the traditional complete-fixing-only method fails to resolve the ambiguities.

In the example shown in FIG. 16B, the partial fixing technique prevents fixing a validated-but-wrong full solution. The validated sets are Full and Part$_2$. However, the solutions for sv 11 and sv 28 differ. Thus, the originally accepted full solution will be rejected.

I. Combination of Techniques

The presented techniques can be used individually, two at a time, or all three in combination.

For best results, all three of the presented techniques can and should be combined. For example, the observation equation and state vector are given above for combining clock-error difference and frequency-dependent-bias modeling. Applying the partial fixing method to the filter results is possible and recommended in addition.

The observation equations (4) and (6) become:

$$_b\lambda^s \Delta_b \Phi^s_{r,q} = \begin{matrix} \Delta R^s_{r,q} + \Delta \delta t_{g_1,r,q} + \Delta \partial t_{g_i,r,q} + \Delta T^s_{r,q} - \\ \Delta_b I^s_{r,q} + (_b\lambda^s - _b\lambda^0_{g_i})_b\omega_{g_i,r,q} - _b\lambda^s \Delta_b N^s_{r,q} \end{matrix} \quad (43)$$

$$\Delta_b \rho^s_{r,q} = \Delta R^s_{r,q} + \Delta \delta t_{g_1,r,q} + \Delta \partial t_{g_i,r,q} + \Delta T^s_{r,q} + \Delta_b I^s_{r,q} \quad (44)$$

and, if the satellite s is from GNSS 1, which is assumed here to be of FDMA-type:

$$_b\lambda^s \Delta_b \Phi^s_{r,q} = \begin{matrix} \Delta R^s_{r,q} + \Delta \delta t_{g_1,r,q} + \Delta T^s_{r,q} - \Delta_b I^s_{r,q} + \\ (_b\lambda^s - _b\lambda^0_{g_i})_b\omega_{g_1,r,q} - _b\lambda^s \Delta_b N^s_{r,q} \end{matrix} \quad (45)$$

$$\Delta_b \rho^s_{r,q} = \Delta R^s_{r,q} + \Delta \delta t_{g_1,r,q} + \Delta T^s_{r,q} + \Delta_b I^s_{r,q} \quad (46)$$

The complete state vector is then defined by:

$$\vec{x} = \begin{pmatrix} x \\ y \\ z \\ \Delta \delta t_{g_1,r,q} \\ \Delta \partial t_{g_2,r,q} \\ \vdots \\ \Delta \partial t_{g_{ng},r,q} \\ _b\omega_{g_i,r,q} \\ \Delta_b N^1_{r,q} \\ \vdots \\ \Delta_b N^{ns}_{r,q} \\ \text{others} \dots \end{pmatrix} \quad (47)$$

For the example (9) with 2 bands $L_1$ and $L_2$ and 5 satellites $s_1, \dots, s_5$ from two GNSS $g_1$ and $g_2$ as before:

$$\vec{x} = \begin{pmatrix} x_r \\ y_r \\ z_r \\ \Delta \delta t_{g_1,r,q} \\ \Delta \partial t_{g_2,r,q} \\ L_1 \omega_{g_i,r,q} \\ L_2 \omega_{g_i,r,q} \\ \Delta_{L_1} N^{s_1}_{r,q} \\ \Delta_{L_2} N^{s_1}_{r,q} \\ \Delta_{L_1} N^{s_2}_{r,q} \\ \Delta_{L_2} N^{s_2}_{r,q} \\ \Delta_{L_1} N^{s_3}_{r,q} \\ \Delta_{L_2} N^{s_3}_{r,q} \\ \Delta_{L_1} N^{s_4}_{r,q} \\ \Delta_{L_2} N^{s_4}_{r,q} \\ \Delta_{L_1} N^{s_5}_{r,q} \\ \Delta_{L_2} N^{s_5}_{r,q} \end{pmatrix} \quad (48)$$

J. Apparatus

Figure 17:
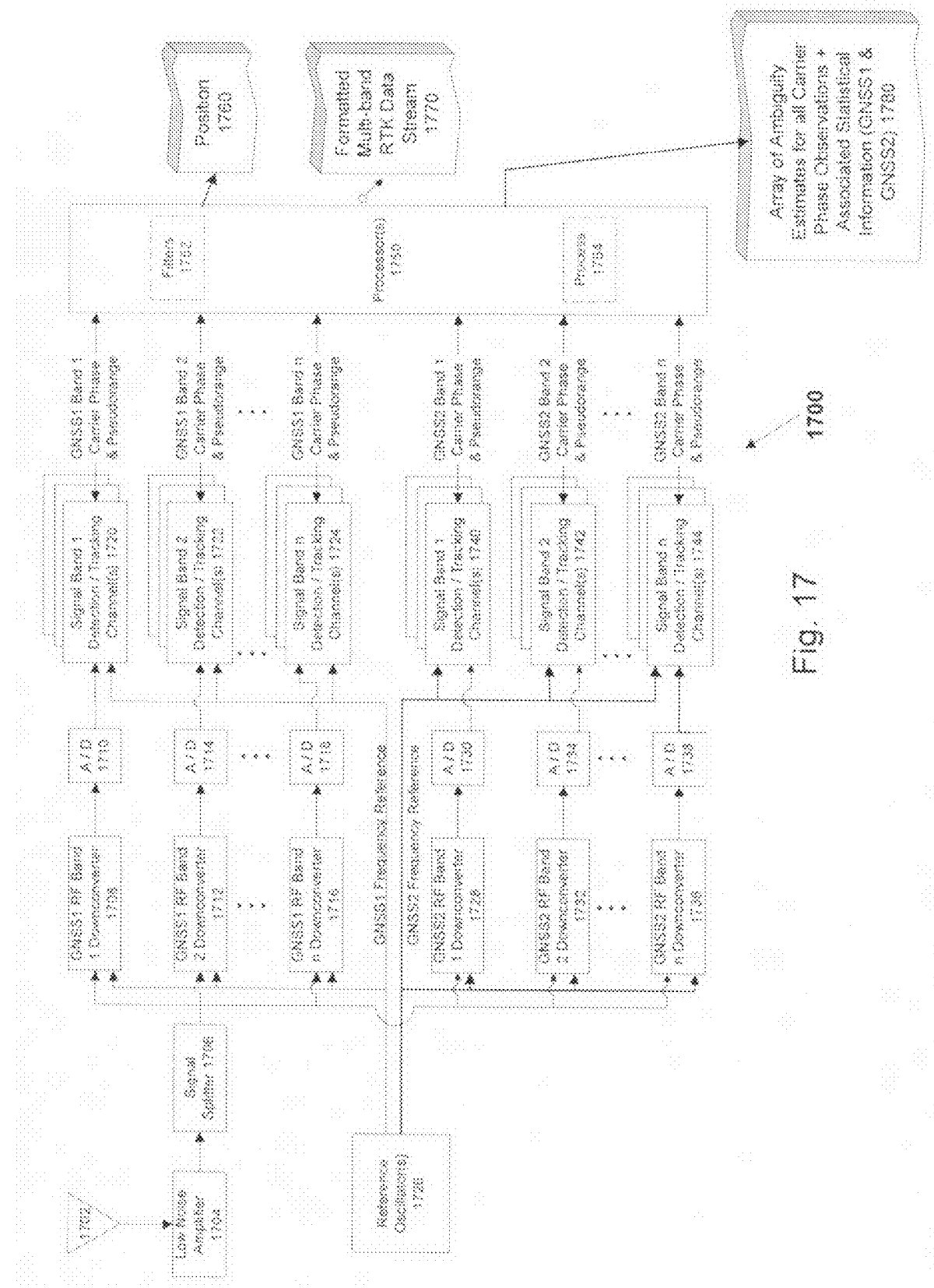
FIG. 17 is a schematic diagram of a multi-GNSS receiver in which embodiments of one or more of the described inventive concepts can be implemented.

FIG. 17 is a schematic diagram of a multi-GNSS receiver in which embodiments of one or more of the inventive concepts (clock-error-bias modeling in the filter(s), frequency-dependent-bias modeling in the filter(s), and/or partial fixing) can be implemented.

Figure 18:
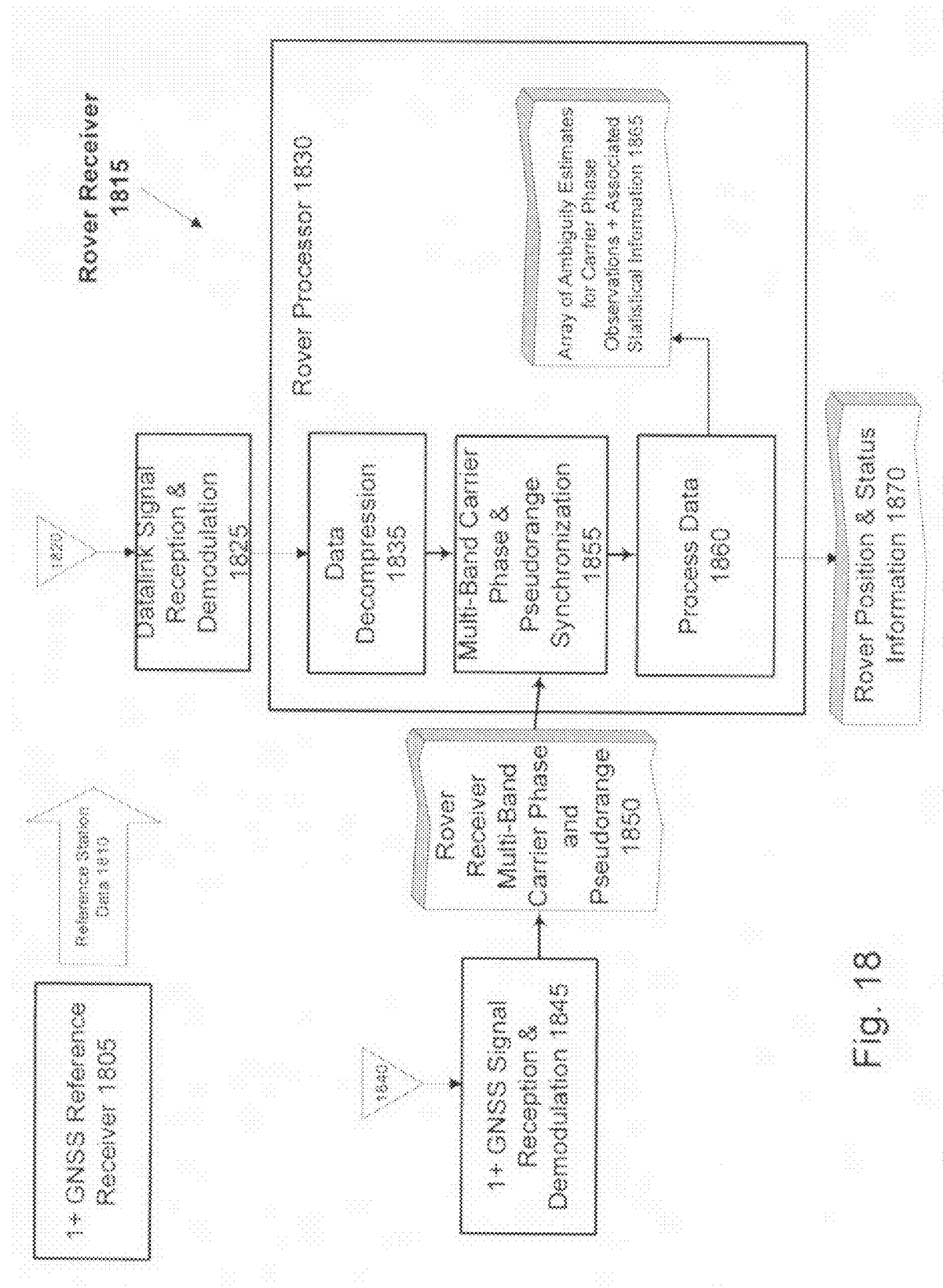
FIG. 18 is a schematic diagram illustrating use of one or more of the described inventive concepts to enhance processing in a rover supplied with data from a reference station.

FIG. 18 is a schematic diagram illustrating use of one or more of the inventive concepts (clock-error-bias modeling in the filter(s), frequency-dependent-bias modeling in the filter(s), and/or partial fixing) to enhance processing in a rover supplied with data from a reference station.

The described methods can be implemented in a variety of hardware configurations, e.g., in a processor with instructions for performing one or more of the above methods (such as processor 900 in FIG. 9, processor 1300 in FIG. 13, processor(s) 1750 in FIG. 17, rover processor 1830 in FIG. 18, or the like). The processor can be separate from a receiver or can form part of a GNSS receiver.

K. Implementation

Those of ordinary skill in the art will realize that the detailed description of embodiments of the present invention is illustrative only and is not intended to be in any way limiting. Other embodiments of the present invention will readily suggest themselves to such skilled persons having the benefit of this disclosure. In the interest of clarity, not all of the routine features of the implementations described herein are shown and described. It will be appreciated that in the development of any such actual implementation, numerous implementation-specific decisions must be made to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with embodiments of the present invention, the components, process steps and/or data structures may be implemented using various types of operating systems (OS), computer platforms, firmware, computer programs, computer languages and/or general-purpose machines. The methods can be run as a programmed process running on processing circuitry. The processing circuitry can take the form of various combinations of processors and operating systems, or a stand-alone device. The processes can be implemented as instructions executed by such hardware, by hardware alone, or by any combination thereof. The software may be stored on a program storage device readable by a machine. Computational elements, such as filters and banks of filters, can be readily implemented using an object-oriented programming language such that each required filter is instantiated as needed. Those of skill in the art will recognize that devices of a less general-purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with an embodiment of the present invention, the methods may be implemented on a data processing computer such as a personal computer, workstation computer, mainframe computer, or high-performance server running an OS such as Microsoft Windows XP and Windows 2000, available from Microsoft Corporation of Redmond, Wash., or Solaris available from Sun Microsystems, Inc. of Santa Clara, Calif., or various versions of the Unix operating system such as Linux available from a number of vendors. The methods may also be implemented on a multiple-processor system, or in a computing environment including various peripherals such as input devices, output devices, displays, pointing devices, memories, storage devices, media interfaces for transferring data to and from the processor(s), and the like. Such a computer system or computing environment may be networked locally, or over the Internet.

According to another embodiment a program is provided including instructions adapted to cause a data processor to carry out a method with the features of the above-described embodiments. According to another embodiment a computer-readable medium embodying the program is provided. The computer-readable medium can comprise any type of computer-readable medium on which information is stored and/or embodied permanently or temporarily in a tangible form, including without limitation magnetic media, optical media, analog signals and digital signals. According to another embodiment a computer program product comprises the computer-readable medium embodying the program.

L. Inventive Concepts

The following is a partial outline of the inventive concepts:
A. Clock Difference Modeling
1. A method of processing signal data derived from signals received at multiple stations from satellites of two or more GNSS, each GNSS having a respective clock error, comprising:
   a. preparing single-difference data by differencing signal data derived from signals received at a first station from signal data derived from signals received at a second station, and
   b. applying to the single-difference data a filter defined by a state vector to estimate a set of carrier ambiguities, wherein the state vector comprises a first clock-error state representing clock error of a first GNSS, and a second clock-error state representing a difference between clock error of the first GNSS and clock error of a second GNSS.
2. The method of A.1., wherein the state vector further comprises states representing position of each station and states representing carrier ambiguities.
3. The method of one of A.1.-A.2., wherein the state vector further comprises states representing position of each station and states representing carrier ambiguities for at least one carrier frequency combination.
4. The method of one of A.1.-A.3., further comprising selecting one satellite of each GNSS as a reference satellite, and constraining the carrier ambiguities.
5. The method of one of A.1.-A.4., wherein constraining the carrier ambiguities comprises determining single-differenced code-minus-carrier estimates of the carrier ambiguities.
6. The method of A.5., wherein constraining the carrier ambiguities comprises adding to the state vector with a variance of zero the single-differenced code-minus-carrier estimates of the carrier ambiguities.
7. The method of A.5., wherein constraining the carrier ambiguities comprises adding to the state vector with a small non-zero variance the single-differenced code-minus-carrier estimates of the carrier ambiguities.
8. The method of one of A.1.-A.4., wherein constraining the carrier ambiguities comprises determining the carrier ambiguities by iterating a variance/covariance matrix of a floating solution over the carrier ambiguities to be constrained.
9. The method of one of A.4.-A.8., wherein the filter is a geometry filter of a set of factorized filters applied to the single-difference data.
10. The method of one of A.1.-A.9., wherein the second clock-error state is constant and has an unknown initial value.

11. The method of one of A.1.-A.9., further comprising applying a noise input to the second clock-error state.
12. The method of A.11, wherein the noise input is a Random Walk noise input.
13. The method of one of A.1.-A.9., wherein the second clock-error state is defined by a First Order Gauss-Markov Process.
14. The method of one of A.1.-A.9., further comprising assigning the second clock-error state an initial value of zero and an initial variance.
15. The method of one of A.1-A.13., further comprising assigning the first clock-error state an initial value of zero and an initial variance.
16. The method of one of A.1.-A.13., wherein the state vector further comprises a third clock-error state representing a difference between clock error of the first GNSS and clock error of a third GNSS.
17. The method of one of A.1-A.16., wherein preparing single-difference data further comprises differencing signal data derived from signals received at the first station from signal data derived from signals received at one or more additional stations.

B. Frequency-Dependent Bias Modeling

1. A method of processing signal data derived from signals received at multiple stations from satellites of two or more GNSS, at least one GNSS comprising a FDMA GNSS, comprising:
    a. preparing single-difference data by differencing signal data derived from signals received at a first station from signal data derived from signals received at a second station, and
    b. applying to the single-difference data a filter defined by a state vector to estimate a set of carrier ambiguities, wherein the state vector comprises a state representing a wavelength/frequency-dependent factor for each band of each FDMA GNSS.
2. The method of B.1., wherein the wavelength/frequency-dependent factor represents a difference to a reference wavelength.
3. The method of B.2., wherein one GNSS comprises the GLONASS system and wherein the wavelength/frequency-dependent factor represents a difference to a GLONASS wavelength.
4. The method of B.1., wherein each satellite of the FDMA GNSS has a unique carrier band, and wherein the wavelength/frequency-dependent factor for a given satellite is a coefficient based on the unique carrier band of the given satellite.
5. The method of one of B.1.-B.4., wherein the filter is a geometry filter of a set of factorized filters applied to the single-difference data.
6. The method of one of B.1.-B.5., wherein the state vector further comprises states representing position of each station and states representing carrier ambiguities for at least one carrier frequency.
7. The method of one of B.1.-B.5., wherein the state vector further comprises states representing position of each station and states representing carrier ambiguities for at least one carrier frequency combination.
8. The method of one of B.1.-B.7., further comprising fixed-ambiguity position computation.
9. The method of one of B.1.-B.7., further comprising single-differenced fixed-ambiguity position computation.
10. The method of one of B.1.-B.7., further comprising double-differenced fixed-ambiguity position computation.

C. Partial Fixing

1. A method of processing signal data derived from signals received at multiple stations from satellites of one or more GNSS, comprising:
    a. determining from the signal data a complete set of integer ambiguities for all satellites,
    b. determining validity of the integer ambiguities of the complete set and at least one quality measure for the complete set,
    c. for each subset of a plurality of subsets of the satellites, determining a partial set of integer ambiguities,
    d. for each of the partial sets, determining validity of the integer ambiguities of the partial set and at least one quality measure for the partial set, and
    e. from among those of the complete set and the partial sets determined to be valid, selecting as correct a set for which the quality measure is optimum.
2. The method of C.1., wherein the set selected as correct comprises a partial set, the method further comprising augmenting the set selected as correct with integer ambiguities of another set or partial set.
3. The method of one of C.1.-C.2., wherein the quality measure is at least one of:
    a. ratio probability, and
    b. Fischer probability test.
4. The method of one of C.1.-C.3., wherein the signal data are derived from signals received at multiple stations from satellites of two or more GNSS.
5. The method of C.4., wherein at least one subset of the satellites comprises satellites of less than all of the two or more GNSS.
6. The method of one of C.1.-C.5., wherein at least one subset of the satellites comprises all but one of the satellites.
7. The method of one of C.1.-C.6., wherein at least one subset of the satellites comprises all but two of the satellites.
8. The method of one of C.1.-C.7., wherein determining from the signal data a complete set of integer ambiguities for all satellites comprises:
    a. determining from the set of signal data a complete set of floating-point ambiguities with associated statistical data; and
    b. determining from the complete set of floating-point ambiguities a complete set of fixed-integer ambiguities.
9. The method of one of C.1-C.8., wherein determining a partial set of integer ambiguities comprises processing a subset of the signal data.
10. The method of C.8., wherein determining a partial set of integer ambiguities comprises preparing from the complete set of floating-point ambiguities a partial set of floating-point ambiguities, and processing the partial set of floating-point ambiguities to produce the partial set of integer ambiguities.
11. The method of one of C.8.-C.10., wherein the array of floating-point ambiguities comprises single-differenced ambiguity estimates.
12. The method of one of C.8.-C.10., wherein the array of floating-point ambiguities comprises double-differenced ambiguity estimates.

D. Combinations

1. A method of A. combined with a method of B.
2. A method of A. combined with a method of C.
3. A method of B. combined with a method of C.
4. A method of A. combined with a method of B. and with a method of C.

E. Apparatus

1. Processing structure, e.g, a processor with instructions for performing one or more of the above methods.

2. A GNSS receiver having a processor with instructions for performing one or more of the above methods.

The invention claimed is:

1. A method of processing signal data derived from signals received at multiple stations from satellites of two or more GNSS, at least one GNSS comprising a FDMA GNSS, comprising:
   a. preparing single-difference data by differencing signal data derived from signals received at a first station from signal data derived from signals received at a second station; and
   b. applying to the single-difference data a filter defined by a state vector to estimate a set of carrier ambiguities, wherein the state vector comprises one of (1) a state representing a wavelength/frequency-dependent factor for each band of each FDMA GNSS and (2) a state representing a coefficient based on FDMA satellite wavelength wherein the coefficient is equivalent to an ambiguity-estimation error.

2. The method of claim 1, wherein the wavelength/frequency-dependent factor represents a difference to a reference wavelength.

3. The method of claim 2, wherein one GNSS comprises the GLONASS system and wherein the wavelength/frequency-dependent factor represents a difference to a GLONASS wavelength.

4. The method of claim 1, wherein each satellite of the FDMA GNSS has a unique carrier band, and wherein the wavelength/frequency-dependent factor for a given satellite is a coefficient based on the unique carrier band of the given satellite.

5. The method of claim 1, wherein the filter is a geometry filter of a set of factorized filters applied to the single-difference data.

6. The method of claim 1, wherein the state vector further comprises states representing position of each station and states representing carrier ambiguities for at least one carrier frequency.

7. The method of claim 1, wherein the state vector further comprises states representing position of each station and states representing carrier ambiguities for at least one carrier frequency combination.

8. The method of claim 1, further comprising computing fixed-ambiguity position.

9. The method of claim 1, further comprising computing single-differenced fixed-ambiguity position.

10. The method of claim 1, further comprising computing double-differenced fixed-ambiguity position.

11. The method of claim 1, further comprising:
   i. determining from the signal data a complete set of integer ambiguities for all satellites;
   ii. determining validity of the integer ambiguities of the complete set and at least one quality measure for the complete set;
   iii. for each subset of a plurality of subsets of the satellites, determining a partial set of integer ambiguities;
   iv. for each of the partial sets, determining validity of the integer ambiguities of the partial set and at least one quality measure for the partial set; and
   v. from among those of the complete set and the partial sets determined to be valid, selecting as correct a set for which the quality measure is optimum.

12. The method of claim 11, wherein the set selected as correct comprises a partial set, the method further comprising augmenting the set selected as correct with integer ambiguities of another set or partial set.

13. The method of claim 11, wherein the quality measure is at least one of: ratio probability, and Fischer probability test.

14. The method of claim 11, wherein the signal data are derived from signals received at multiple stations from satellites of two or more GNSS.

15. The method of claim 14, wherein at least one subset of the satellites comprises satellites of less than all of the two or more GNSS.

16. The method of claim 11, wherein at least one subset of the satellites comprises all but one of the satellites.

17. The method of claim 11, wherein at least one subset of the satellites comprises all but two of the satellites.

18. The method of claim 11, wherein determining from the signal data a complete set of integer ambiguities for all satellites comprises:
   (1) determining from the set of signal data a complete set of floating-point ambiguities with associated statistical data; and
   (2) determining from the complete set of floating-point ambiguities a complete set of fixed-integer ambiguities.

19. The method of claim 18, wherein determining a partial set of integer ambiguities comprises
   (1) preparing from the complete set of floating-point ambiguities a partial set of floating-point ambiguities, and
   (2) processing the partial set of floating-point ambiguities to produce the partial set of integer ambiguities.

20. The method of claim 18, wherein the array of floating-point ambiguities comprises single-differenced ambiguity estimates.

21. The method of claim 18, wherein the array of floating-point ambiguities comprises double-differenced ambiguity estimates.

22. The method of claim 11, wherein determining a partial set of integer ambiguities comprises processing a subset of the signal data.

23. A computer-readable medium in which a program is embodied, wherein the program comprises instructions adapted to cause a processor to execute the method of claim 1.

24. A computer program product comprising the computer-readable medium of claim 23.

25. Apparatus for processing signal data derived from signals received at multiple stations from satellites of two or more GNSS, at least one GNSS comprising a FDMA GNSS, comprising a processor with instructions for:
   a. preparing single-difference data by differencing signal data derived from signals received at a first station from signal data derived from signals received at a second station; and
   b. applying to the single-difference data a filter defined by a state vector to estimate a set of carrier ambiguities, wherein the state vector comprises one of (1) a state representing a wavelength/frequency-dependent factor for each band of each FDMA GNSS and (2) a state representing a coefficient based on FDMA satellite wavelength wherein the coefficient is equivalent to an ambiguity-estimation error.

26. The apparatus of claim 25, wherein the wavelength/frequency-dependent factor represents a difference to a reference wavelength.

27. The apparatus of claim 26, wherein one GNSS comprises the GLONASS system and wherein the wavelength/frequency-dependent factor represents a difference to a GLONASS wave-length.

28. The apparatus of claim 25, wherein each satellite of the FDMA GNSS has a unique carrier band, and wherein the wavelength/frequency-dependent factor for a given satellite is a coefficient based on the unique carrier band of the given satellite.

29. The apparatus of claim 25, wherein the filter is a geometry filter of a set of factorized filters applied to the single-difference data.

30. The apparatus of claim 25, wherein the state vector further comprises states representing position of each station and states representing carrier ambiguities for at least one carrier frequency.

31. The apparatus of claim 25, wherein the state vector further comprises states representing position of each station and states representing carrier ambiguities for at least one carrier frequency combination.

32. The apparatus of claim 25, wherein the instructions comprise instructions for computing fixed-ambiguity position.

33. The apparatus of claim 25, wherein the instructions comprise instructions for computing single-differenced fixed-ambiguity position.

34. The apparatus of claim 25, wherein the instructions comprise instructions for computing double-differenced fixed-ambiguity position.

35. The apparatus of claim 25, further comprising instructions for:
   i. determining from the signal data a complete set of integer ambiguities for all satellites;
   ii. determining validity of the integer ambiguities of the complete set and at least one quality measure for the complete set;
   iii. for each subset of a plurality of subsets of the satellites, determining a partial set of integer ambiguities;
   iv. for each of the partial sets, determining validity of the integer ambiguities of the partial set and at least one quality measure for the partial set; and from among those of the complete set and the partial sets determined to be valid, selecting as correct a set for which the quality measure is optimum.

36. The apparatus of claim 35, wherein the set selected as correct comprises a partial set, the method further comprising augmenting the set selected as correct with integer ambiguities of another set or partial set.

37. The apparatus of claim 35, wherein the quality measure is at least one of: ratio probability, and Fischer probability test.

38. The apparatus of claim 35, wherein the signal data are derived from signals received at multiple stations from satellites of two or more GNSS.

39. The apparatus of claim 38, wherein at least one subset of the satellites comprises satellites of less than all of the two or more GNSS.

40. The apparatus of claim 35, wherein at least one subset of the satellites comprises all but one of the satellites.

41. The apparatus of claim 35, wherein at least one subset of the satellites comprises all but two of the satellites.

42. The apparatus of claim 35, wherein the instructions for determining from the signal data a complete set of integer ambiguities for all satellites comprises instructions for:
   i. determining from the set of signal data a complete set of floating-point ambiguities with associated statistical data; and
   ii. determining from the complete set of floating-point ambiguities a complete set of fixed-integer ambiguities.

43. The apparatus of claim 42, wherein the instructions for determining a partial set of integer ambiguities comprises
   i. instructions for preparing from the complete set of floating-point ambiguities a partial set of floating-point ambiguities, and
   ii. instructions for processing the partial set of floating-point ambiguities to produce the partial set of integer ambiguities.

44. The apparatus of claim 42, wherein the array of floating-point ambiguities comprises single-differenced ambiguity estimates.

45. The apparatus of claim 42, wherein the array of floating-point ambiguities comprises double-differenced ambiguity estimates.

46. The apparatus of claim 35, wherein the instructions for determining a partial set of integer ambiguities comprises instructions for processing a subset of the signal data.

47. The apparatus of claim 25, wherein the processor forms a part of a GNSS receiver.

* * * * *